US011976788B2

(12) United States Patent
Koizumi et al.

(10) Patent No.: US 11,976,788 B2
(45) Date of Patent: May 7, 2024

(54) COMPRESSED AIR PRODUCTION FACILITY, COMPRESSED AIR PRESSURE SETPOINT ADJUSTING METHOD, AND COMPRESSED AIR PRESSURE SETPOINT ADJUSTING PROGRAM

(71) Applicant: Hitachi Industrial Equipment Systems Co., Ltd., Tokyo (JP)

(72) Inventors: Minoru Koizumi, Tokyo (JP); Mitsuhiro Imai, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 615 days.

(21) Appl. No.: 16/789,544

(22) Filed: Feb. 13, 2020

(65) Prior Publication Data

US 2020/0340623 A1 Oct. 29, 2020

(30) Foreign Application Priority Data

Apr. 24, 2019 (JP) ................................ 2019-083422

(51) Int. Cl.
*F17C 5/06* (2006.01)
*F04B 41/06* (2006.01)
(Continued)

(52) U.S. Cl.
CPC ................ *F17C 5/06* (2013.01); *F04B 41/06* (2013.01); *F04B 49/007* (2013.01); *F04B 49/08* (2013.01);
(Continued)

(58) Field of Classification Search
CPC ...... F17C 5/06; F17C 2250/032; F04B 41/06; F04B 49/007; F04D 27/004
See application file for complete search history.

(56) References Cited

U.S. PATENT DOCUMENTS 6,287,083 B1 9/2001 Hase et al.
2003/0086789 A1 5/2003 Raghavchari
(Continued)

FOREIGN PATENT DOCUMENTS

CN 102177342 A 9/2011
CN 106523339 A 3/2017
(Continued)

OTHER PUBLICATIONS

Chinese-language Office Action issued in Chinese Application No. 202010105927.7 dated Jul. 16, 2021 (11 pages).
(Continued)

*Primary Examiner* — Reinaldo Sanchez-Medina
*Assistant Examiner* — Nicole Gardner
(74) *Attorney, Agent, or Firm* — Crowell & Moring LLP

(57) ABSTRACT

A compressed air production facility that reduces an extension cost without stopping an operating air compressor in a case of increasing the number of air compressors to cope with an increase in demands for compressed air is provided. A compressed air system supplies compressed air to compressed air consuming devices connected to a compressed air distributions line, the compressed air system including a plurality of air compressor units connected to the compressed air distributions line via respective air tanks. Each of the air compressor units includes: an air compressor main body; an adjustor of pressure setpoint that adjusts a pressure setpoint of an air tank to which the air compressor unit including the adjustor of pressure setpoint is connected; and a controller of air compressor that operates a rotational frequency of the air compressor main body on the basis of the pressure setpoint adjusted by the adjustor of pressure setpoint and a pressure of the air tank. The adjustor of pressure setpoint adjusts the pressure setpoint on the basis of
(Continued)

a control variable indicating the rotational frequency of the air compressor main body or the pressure of the air tank.

12 Claims, 18 Drawing Sheets

(51) Int. Cl.

| | |
|---|---|
| ***F04B 49/00*** | (2006.01) |
| ***F04B 49/08*** | (2006.01) |
| ***F04D 27/00*** | (2006.01) |
| ***F17C 13/02*** | (2006.01) |

(52) U.S. Cl.
CPC .......... *F04D 27/004* (2013.01); *F17C 13/025* (2013.01); *F05B 2270/301* (2013.01); *F05B 2270/706* (2013.01); *F17C 2221/031* (2013.01); *F17C 2250/032* (2013.01); *F17C 2250/043* (2013.01); *F17C 2270/0563* (2013.01)

(56) References Cited

U.S. PATENT DOCUMENTS

| | | | |
|---|---|---|---|
| 2011/0206538 | A1 | 8/2011 | Yokota et al. |
| 2018/0223832 | A1 | 8/2018 | Ren et al. |

FOREIGN PATENT DOCUMENTS

| | | | |
|---|---|---|---|
| CN | 106605063 | A | 4/2017 |
| JP | 2000-38990 | A | 2/2000 |
| JP | 2000-297765 | A | 10/2000 |
| JP | 2003-65498 | A | 3/2003 |
| JP | 2004-190583 | A | 7/2004 |
| JP | 2010-24845 | A | 2/2010 |

OTHER PUBLICATIONS

Chinese-language Office Action issued in Chinese Application No. 202010105927.7 dated Jul. 5, 2022 with English translation (20 pages).

$t = t_2$ $t = t_4$ $t = t_5$ (BEFORE PRESSURE SETPOINT FINE ADJUSTMENT)

$t = t_5$ (AFTER PRESSURE SETPOINT FINE ADJUSTMENT)

195

| | |
|---|---|
| LOG COUNTER ($i_{log}$) | 1951 |
| LOG INTERVAL ($\Delta T_{log}$) | 1952 |
| NUMBER OF LOGS ($N_{log\_max}$) | 1953 |

196

| | 1964 | 1965 | 1966 |
|---|---|---|---|
| 196-1 | 1 | 08:45:00 | 0.552 |
| 196-2 | 2 | 08:50:21 | 0.549 |
| ⋮ | ⋮ | ⋮ | ⋮ |
| 196-N | $N_{log\_max}$ | 19:00:36 | 0.680 |

COMPRESSED AIR PRODUCTION FACILITY, COMPRESSED AIR PRESSURE SETPOINT ADJUSTING METHOD, AND COMPRESSED AIR PRESSURE SETPOINT ADJUSTING PROGRAM

BACKGROUND OF THE INVENTION

1. Field of the Invention

The present invention relates to a compressed air production facility, a compressed air pressure setpoint adjusting method, and a compressed air pressure setpoint adjusting program.

2. Description of the Related Art

JP-2003-65498-A, for example, discloses a compressed air production facility that copes with an increase in demands for compressed air by additionally connecting a new air compressor (sub air compressor) to another point on a compressed air distributions line with respect to an operating air compressor group (main air compressors). A centralized controller that controls the main air compressors and the sub air compressor to operate via a communication line is provided in the compressed air production facility disclosed in JP-2003-65498-A, and this controller controls the number of operating main air compressors and controls the sub air compressor to operate or to be stopped in response to an increase or decrease in the demands for compressed air.

However, the compressed air production facility according to the conventional technique is configured to control a plurality of air compressors to operate or to be stopped via the communication line. Owing to this, in a case of newly adding an air compressor to cope with the increase in the demands for compressed air, it is required to not only conduct construction work for connecting the to-be-added air compressor to the compressed air distributions line but also lay a communication line between the controller and the to-be-added air compressor, and it takes, therefore, a facility cost and a work cost. Particularly in a case in which the compressed air distributions line is large in scale, a cost of the compressed air distributions line increases. Moreover, it is required to stop the controller since setting work on a controller side is involved. In this way, according to the conventional technique, newly adding an air compressor to cope with the increase in the demands for compressed air disadvantageously involves stopping the operating compressors and involves an extension cost.

SUMMARY OF THE INVENTION

The present invention has been achieved in the light of the aforementioned respects, and one object of the present invention is to reduce an extension cost without stopping an operating air compressor in a case of increasing the number of air compressors to cope with an increase in demands for compressed air.

To attain the object, a compressed air production facility according to one aspect of the present invention is a compressed air production facility for supplying compressed air to compressed air consuming devices connected to a compressed air distributions line, the compressed air production facility including a plurality of air compressors connected to the compressed air distributions line via respective air tanks, each of the air compressors including: an air compressor that compresses air; an adjusting unit that adjusts a pressure setpoint of an air tank to which the air compressor including the adjusting unit is connected; and a control unit that operates a rotational frequency of the air compressor on the basis of the pressure setpoint adjusted by the adjusting unit and a pressure of the air tank, the adjusting unit adjusting the pressure setpoint on the basis of a control variable indicating the rotational frequency of the compressor or the pressure of the air tank, and the control unit stopping rotation of the compressor by reducing the rotational frequency or setting the rotational frequency to zero in a case in which the pressure of the air tank exceeds the pressure setpoint, and keeping the air tank at the pressure setpoint by increasing the control variable of the compressor in a case in which the pressure of the air tank is below the pressure setpoint.

According to the present invention, it is possible to reduce an extension cost without stopping an operating air compressor in a case of increasing the number of air compressors to cope with an increase in demands for compressed air.

DESCRIPTION OF THE PREFERRED EMBODIMENTS

Figure 1:
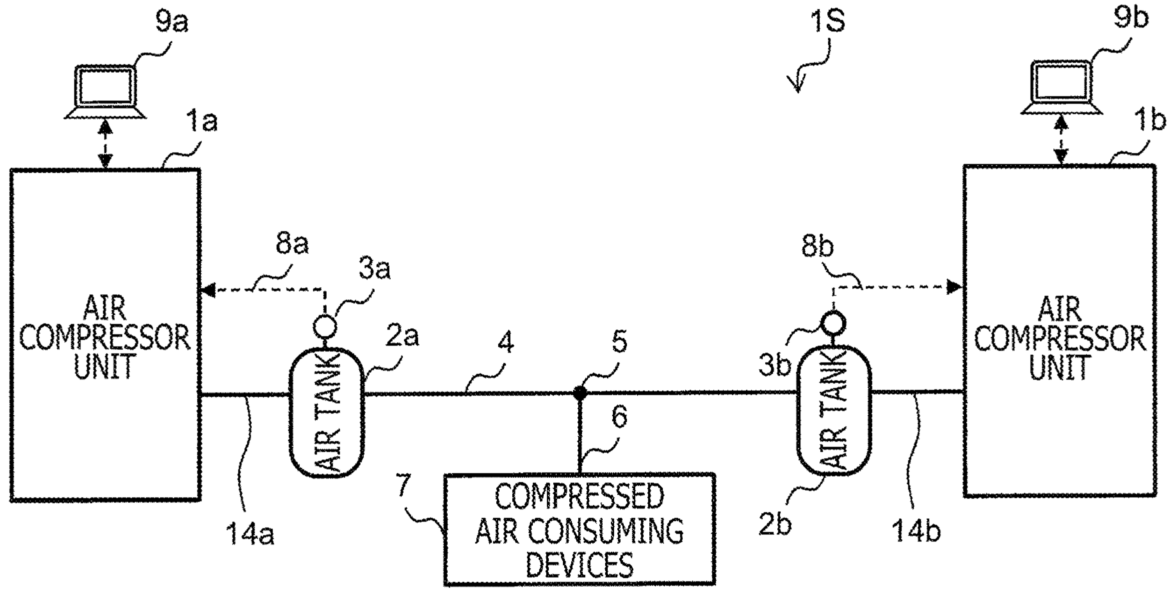
FIG. 1 is an overall schematic configuration diagram of a compressed air system according to a first embodiment.

Embodiments of the present invention will be described in detail with reference to the drawings. The embodiments of the present invention relate to a compressed air production facility that supplies compressed air through a compressed air distributions line to compressed air consuming devices connected to the compressed air distributions line by air compressors each adjusting a volume of discharged air by changing a rotational frequency of each air compressor, and relates to a compressed air production facility that additionally connects an air compressor to cope with an increase in demands for compressed air of compressed air consuming devices and that increases or decreases a volume of discharged air to follow up an increase or decrease in the demands for compressed air.

In the drawings for describing the embodiments, configurations or processes having same or similar functions are denoted by the same reference characters and repetition of description thereof will be omitted. Furthermore, each embodiment and each modification can be combined either partially or wholly within a range of the technical concept of the present invention and within a range of matching.

In the present specification, in a case of generically expressing a plurality of elements denoted by reference characters to which branch numbers are added to the same reference number such as “xxx100-1,” “xxx100-2,” “xxx100a,” and “xxx100b,” the elements are expressed in a way like “xxx100” using only the same number.

First Embodiment

<Configuration of Compressed Air System According to First Embodiment>

FIG. 1 is an overall schematic configuration diagram of a compressed air system 1S according to a first embodiment. In the compressed air system. 1S (compressed air production facility), air compressor units 1*a* and 1*b* are connected to a compressed air distributions line 4 by way of discharging lines 14*a* and 14*b* and air tanks 2*a* and 2*b*, and connected to compressed air consuming devices 7 from a branching point 5 on the compressed air distributions line 4 via a branch line 6. Pressure sensors 3*a* and 3*b* are installed at the air tanks 2*a* and 2*b* and measurement values of the pressure sensors 3*a* and 3*b* can be read from the air compressor units 1*a* and 1*b* via signal lines 8*a* and 8*b*, respectively. Furthermore, input/output devices 9*a* and 9*b* that each enable information to be displayed to an operator and various setting data to be input thereto from the operator via a liquid crystal display, a touch panel, or the like are connected to the air compressor units 1*a* and 1*b*, respectively.

With the configuration described above, it is assumed in the present embodiment that the compressed air system 1S is in a situation in which the air compressor unit 1*a* is already operating and supplying compressed air to the compressed air consuming devices 7, and yet the air compressor unit 1*b* and the air tank 2*b* are connected to the compressed air distributions line 4 and the air compressor unit 1*b* is to start supplying the compressed air to the compressed air consuming devices 7.

<Configuration of Air Compressor Unit According to First Embodiment>

Figure 2:
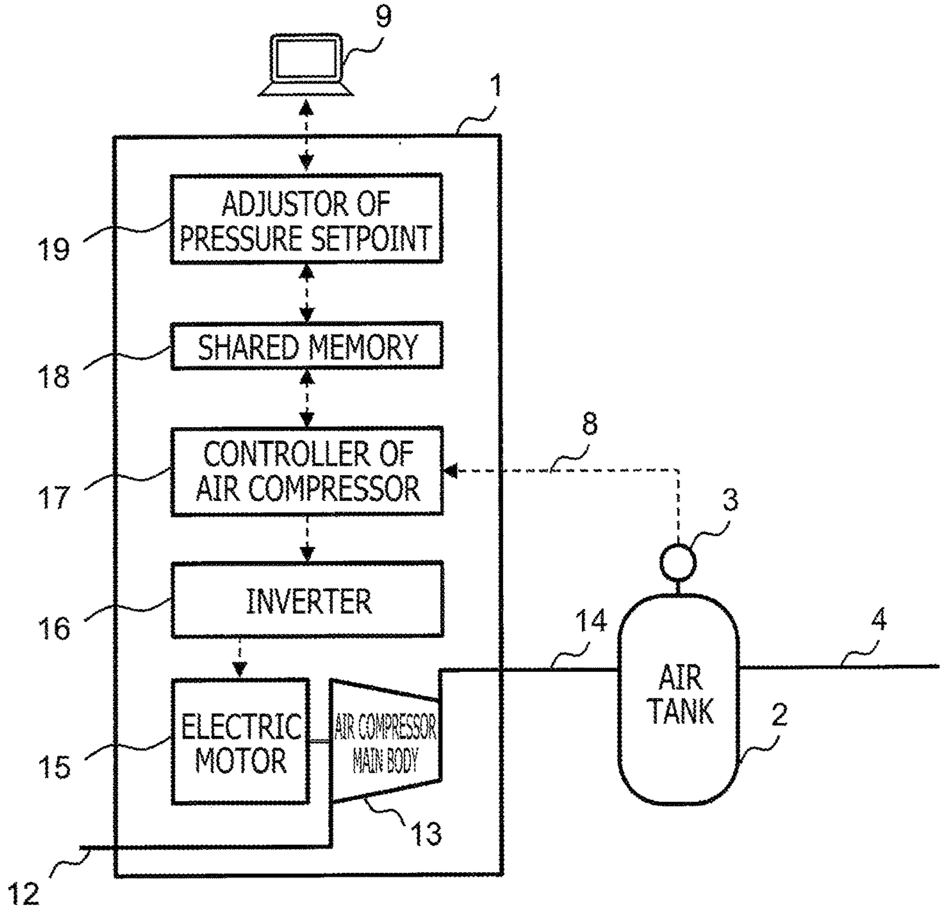
FIG. 2 is a schematic configuration diagram of an air compressor unit according to the first embodiment.

FIG. 2 is a schematic configuration diagram of the air compressor unit 1 according to the first embodiment. An air compressor main body 13 of the air compressor unit 1 compresses air 12 drawn in by suction from atmosphere and discharges the compressed air to the air tank 2 by way of the discharging line 14. The air compressor main body 13 is driven by an electric motor 15. A rotational frequency of the electric motor 15 is controlled by an inverter 16.

A controller of air compressor 17 is a device that instructs the inverter 16 in the rotational frequency of the electric motor 15 as a control variable, adjusts a volume of discharged air from the air compressor main body 13, and keeps a pressure of the air tank 2 to be equal to a pressure setpoint. The controller of air compressor 17 operates the inverter 16 in response to a pressure value of the air tank 2 acquired from the pressure sensor 3 by way of the signal line 8 and a value of the pressure setpoint stored in a shared memory 18.

An adjustor of pressure setpoint 19 is a device that adjusts the pressure setpoint of the air tank 2 by a process to be described later in starting supplying the compressed air from the air compressor unit 1, and notifies the controller of air compressor 17 of the adjusted pressure setpoint via the shared memory 18. The input/output device 9 that outputs and displays an adjusting result of the adjustor of pressure setpoint 19 is connected to the adjustor of pressure setpoint 19.

<Configuration of Shared Memory According to First Embodiment>

Figure 3:
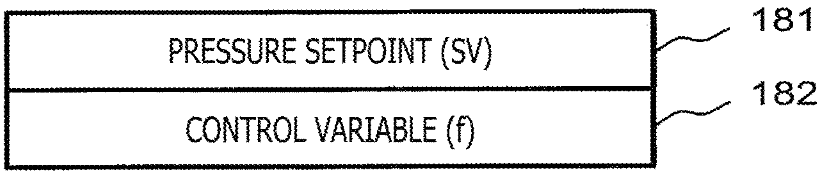
FIG. 3 is a detailed configuration diagram of a shared memory according to the first embodiment.

FIG. 3 is a detailed configuration diagram of the shared memory 18 according to the first embodiment. The shared memory 18 is intended to share data between the controller of air compressor 17 and the adjustor of pressure setpoint 19, and is configured with a field 181 where the adjustor of pressure setpoint 19 stores the pressure setpoint (SV) of the air tank 2 and a field 182 where the controller of air compressor 17 stores a control variable that is an output value from the controller of air compressor 17, that is, a rotational frequency (f) of the electric motor 15.

<Control Process in Controller of Air Compressor According to First Embodiment>

Figure 4:
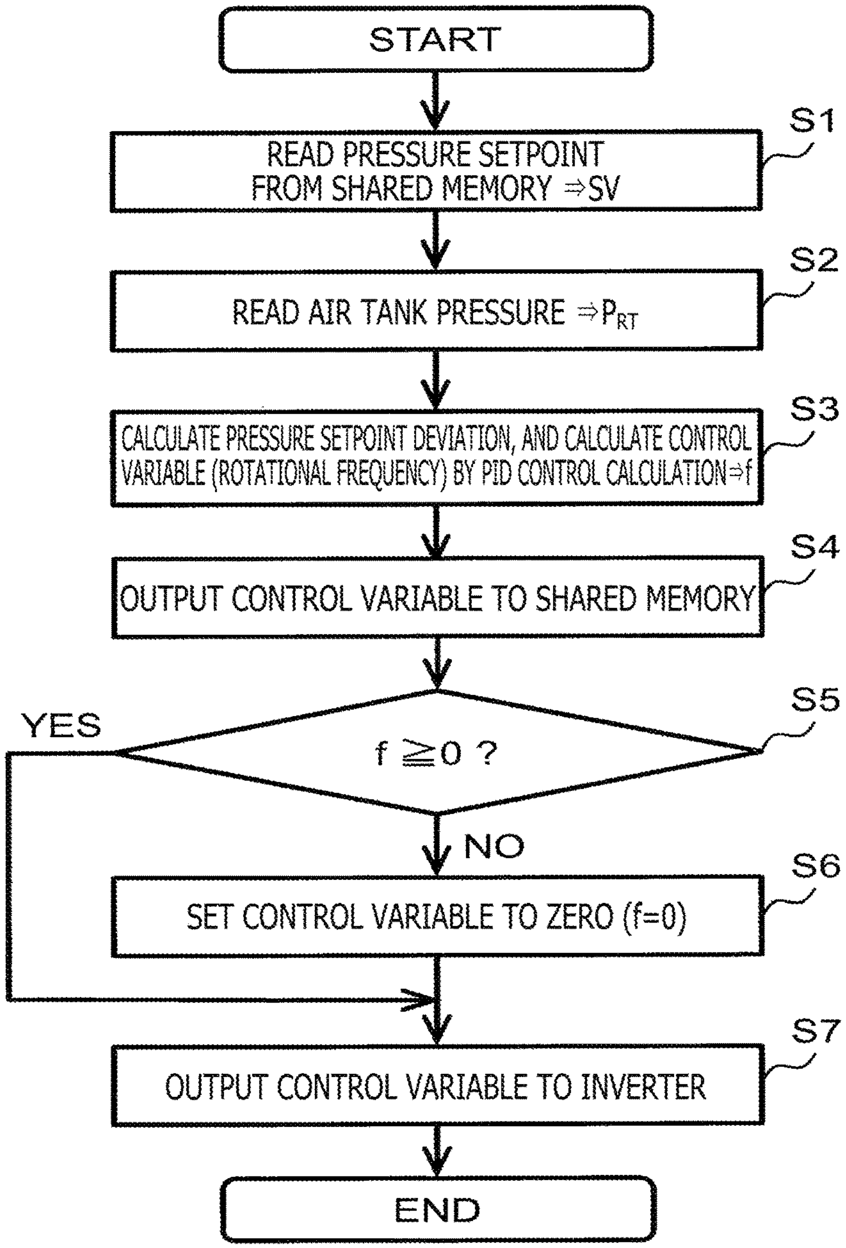
FIG. 4 is a detailed flow of a control process in a controller of air compressor according to the first embodiment.

FIG. 4 is a detailed flow of a control process in the controller of air compressor 17 according to the first embodiment. The present process flow is a process started and executed in a constant cycle, for example, 20 msec cycle.

First, the controller of air compressor 17 refers to the shared memory 18 and reads the pressure setpoint (SV) from the field 181 (Step S1). Next, the controller of air compressor 17 reads an air tank pressure ($P_{RT}$) from the pressure sensor 3 of the air tank 2 via the signal line 8, and performs proportional-integral-differential control (PID control) in response to a deviation from the pressure setpoint (SV), thereby calculating the control variable, that is, the rotational frequency (f) of the electric motor 15 (Step S3). In Step S3, in a case in which the air tank pressure ($P_{RT}$) exceeds the pressure setpoint (SV), the rotational frequency (f) is reduced or set to zero. In a case in which the air tank pressure ($P_{RT}$) is below the pressure setpoint (SV), the rotational frequency (f) is increased.

Next, the controller of air compressor 17 overwrites the rotational frequency (f) of the electric motor 15 calculated in Step S3 in the field 182 of the shared memory 18 (Step S4). Next, the controller of air compressor 17 checks whether a value of the calculated rotational frequency (f) of the electric motor 15 is positive or negative (Step S5). In a case in which the calculated rotational frequency (f) of the electric motor 15 is positive (Step S5: YES), the controller of air compressor 17 moves the process to Step S7. In a case in which the calculated rotational frequency (f) of the electric motor 15 is negative (Step S5: NO), the controller of air compressor 17 moves the process to Step S6.

In Step S6, the controller of air compressor 17 sets the control variable to zero so that the air compressor main body 13 stops operating (Step S6). In Step S7, the controller of air compressor 17 outputs the rotational frequency (f) determined to be positive to the inverter 16 as it is in a case in which Step S7 is subsequent to Step S5, and outputs the control variable of zero to the inverter 16 in a case in which Step S7 is subsequent to Step S6.

If the pressure of the air tank 2 is lower than the pressure setpoint (SV), the control variable is increased and a volume of discharged air from the air compressor unit 1 is increased by the process performed by the controller of air compressor 17 described above; thus, the pressure of the air tank 2 is increased to be closer to the pressure setpoint (SV). Furthermore, if the pressure of the air tank 2 is higher than the pressure setpoint (SV), the control variable is reduced or set to zero and the rotational frequency (f) of the electric motor 15 is reduced or the electric motor 15 is stopped; thus, the volume of discharged air from the air compressor main body 13 is reduced and the pressure of the air tank 2 is also reduced. Repeating this process in the constant cycle enables the pressure value of the air tank 2 to be kept to the pressure setpoint (SV) even in a case in which the demands for compressed air by the compressed air consuming devices 7 vary and the pressure of the air tank 2 varies as a result of a variation of the demands for compressed air.

<Configuration of adjustor of Pressure Setpoint According to First Embodiment>

Figure 5:
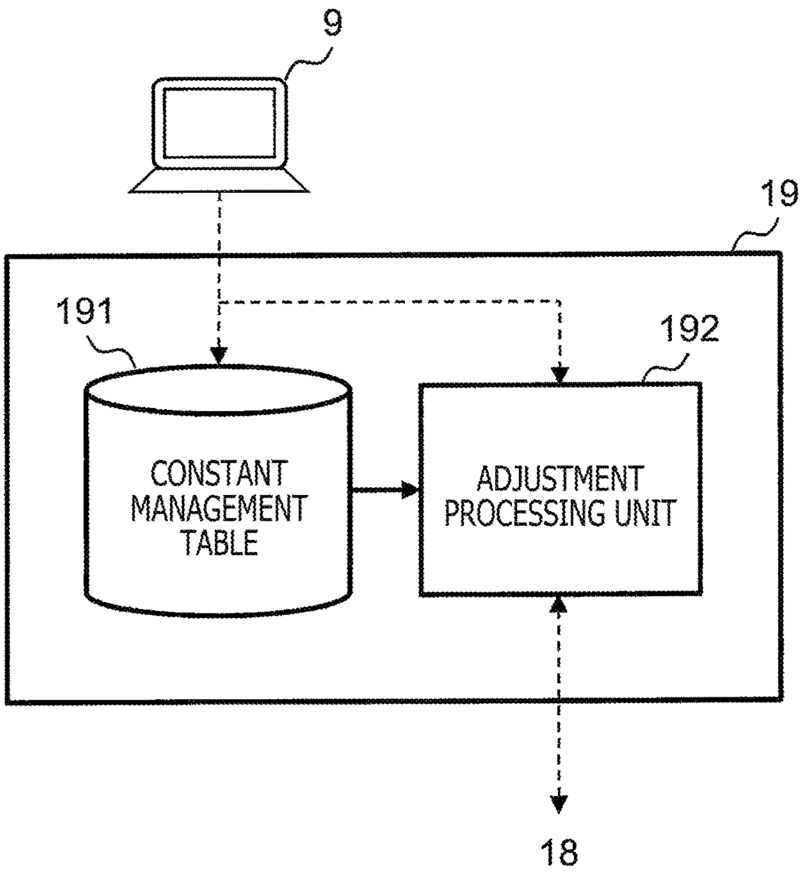
FIG. 5 is a schematic configuration diagram of an adjustor of pressure setpoint according to the first embodiment.
Figure 6:
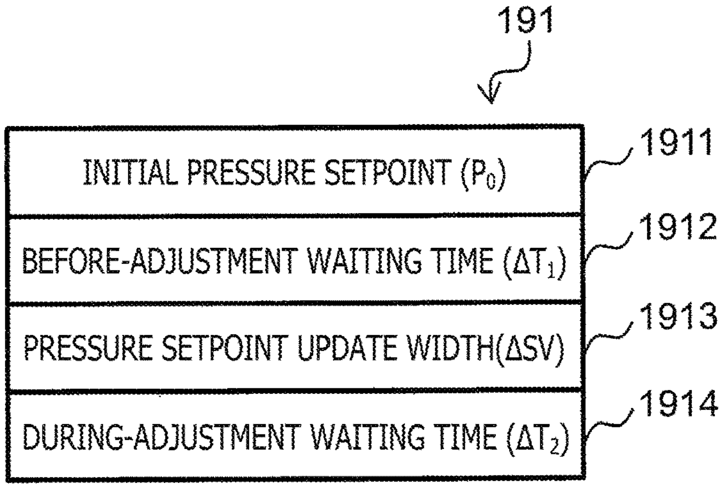
FIG. 6 is a detailed configuration diagram of a constant management table according to the first embodiment.

FIG. 5 is a schematic configuration diagram of the adjustor of pressure setpoint 19 according to the first embodiment. FIG. 6 is a detailed configuration diagram of a constant management table 191 according to the first embodiment. The adjustor of pressure setpoint 19 is configured with the constant management table 191 that stores constants necessary to adjust the pressure setpoint (SV) and an adjustment processing unit 192.

As depicted in FIG. 6, the constant management table 191 is configured with a field 1911 that stores an initial pressure setpoint ($P_0$), a field 1912 that stores before-adjustment waiting time ($\Delta T_1$) since the adjustor of pressure setpoint 19 is started until the adjustor of pressure setpoint 19 starts adjusting the pressure setpoint (SV), a field 1913 that stores an update width ($\Delta$SV) during adjustment of the pressure setpoint (SV), and a field 1914 that stores waiting time ($\Delta T_2$) necessary during the adjustment of the pressure setpoint (SV). Values of these fields are input and set by the input/output device 9 at a time of installing or shipping the air compressor unit 1. It is assumed in the present embodiment that the initial pressure setpoint ($P_0$) in the field 1911 is sufficiently smaller than an air tank pressure setpoint value of the already operating air compressor unit 1*a* and is, for example, an atmospheric pressure (approximately 0.1 Mpa).

<Adjustment Process According to First Embodiment>

Figure 7:
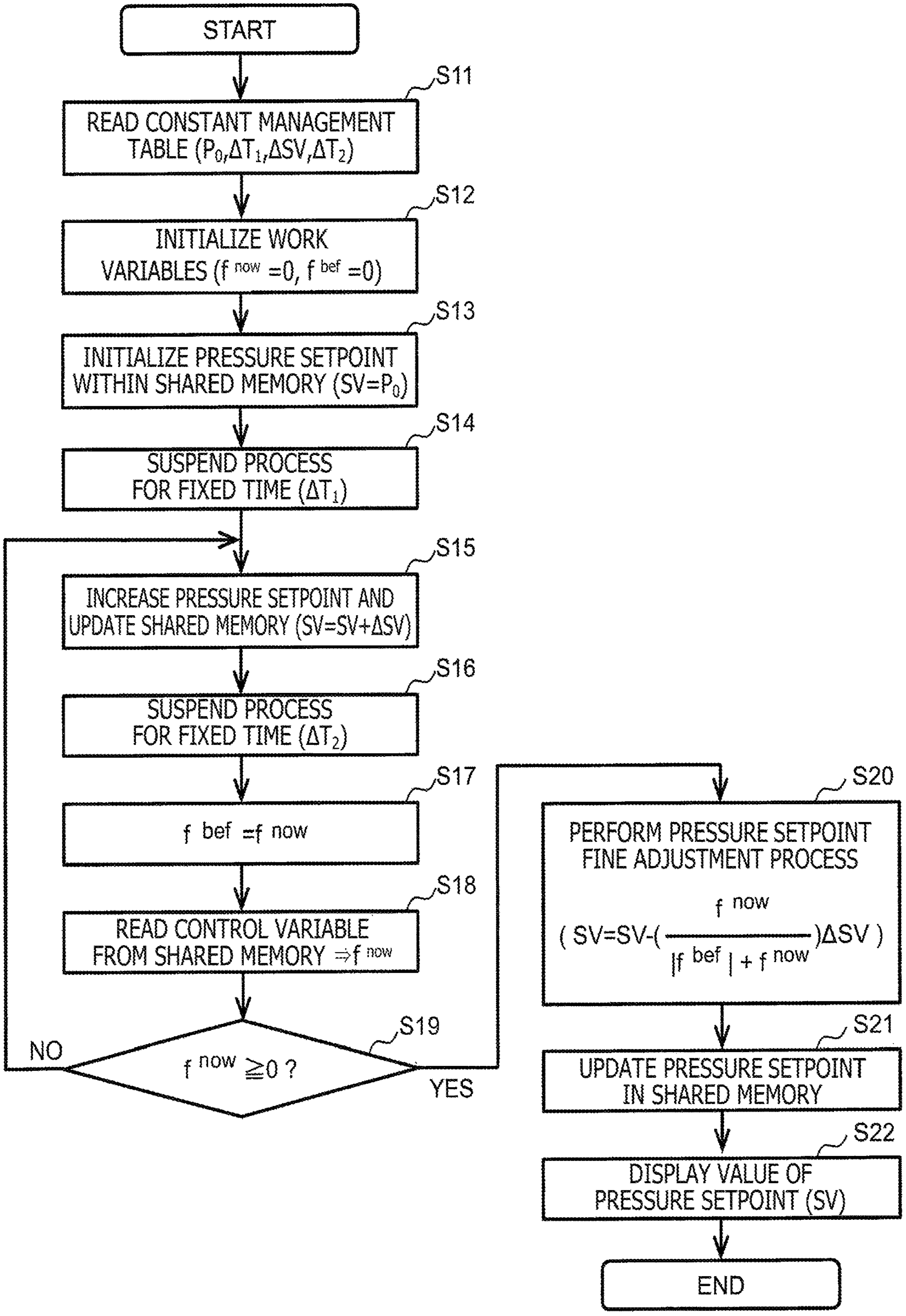
FIG. 7 is a detailed flow of an adjusting process performed in the adjustor of pressure setpoint according to the first embodiment.

FIG. 7 is a detailed flow of the adjustment process performed by the adjustor of pressure setpoint 19 according to the first embodiment. The present adjustment process is a preprocess at a time of starting discharging the compressed air from the air compressor unit 1 and is a process started by the input/output device 9 and executed by the adjustment processing unit 192.

First, the adjustment processing unit 192 reads, as constants used in the process, the initial pressure setpoint ($P_0$), the before-adjustment waiting time ($\Delta T_1$), the pressure setpoint update width ($\Delta$SV), and the during-adjustment waiting time ($\Delta T_2$) from the fields 1911 to 1914 of the constant management table 191 (Step S11).

Next, the adjustment processing unit 192 clears, to zero, a variable ($f^{now}$) that is a work variable for storing a latest control variable output from the controller of air compressor 17 and a variable ($f^{bef}$) that is a work variable for storing a previous control variable to zero to initialize the variables ($f^{now}$ and $f^{bef}$) (Step S12). Next, the adjustment processing unit 192 sets the read initial pressure setpoint ($P_0$) to the field 181 of the shared memory 18 (Step S13). While the pressure setpoint set at this timing is read to the controller of air compressor 17, it is necessary to wait until the air tank pressure reaches a steady-state value because of the operation; thus, the adjustment processing unit 192 suspends the process for the before-adjustment waiting time ($\Delta T_1$) (Step S14).

Next, the adjustment processing unit 192 increases the pressure setpoint (SV) within the shared memory 18 by the read pressure setpoint update width ($\Delta$SV) to update the pressure setpoint (SV) (Step S15), and suspends the process for the during-adjustment waiting time ($\Delta T_2$) to wait for an effect of the update (Step S16). Next, the adjustment processing unit 192 copies the latest control variable ($f^{now}$) to the previous control variable ($f^{bef}$) (Step S17), reads the control variable output by the controller of air compressor 17 from the field 182 within the shared memory 18 to the work variable latest control variable ($f^{now}$) (Step S18), and checks whether the value is equal to or greater than zero (Step S19). In a case in which the latest control variable ($f^{now}$) is negative, that is, the volume of discharged air from the air compressor unit 1 is zero (Step S19: NO), the adjustment processing unit 192 returns the process to Step S15 to increase the pressure setpoint (SV) by the adjustment width ($\Delta$SV), executes Steps S16 to S18, and checks again the latest control variable ($f^{now}$) (Step S19).

In this way, the adjustment processing unit 192 increases the pressure setpoint (SV) while the latest control variable ($f^{now}$) is negative. Furthermore, in a case in which the latest control variable ($f^{now}$) is equal to or greater than zero (Step S19: YES), that is, in a case in which the air compressor unit 1 starts discharging the compressed air, the adjustment processing unit 192 finely adjusts the pressure setpoint (SV)

to a value obtained when the latest control variable ($f^{now}$) is equal to zero, on the basis of the following Equation (1) (Step S20).

[Equation 1]

$$SV = SV - \left(\frac{f^{now}}{|f^{bef}| + f^{now}}\right)\Delta S \tag{1}$$

Next, the adjustment processing unit 192 updates the field 181 within the shared memory 18 using the value of the pressure setpoint (SV) adjusted in Step S20 (Step S21), and displays the value of the pressure setpoint (SV) on the input/output device 9 (Step S22).

<Time Courses of Demands for Compressed Air, Pressures Setpoint of Air Compressor Units, and Volumes of Discharged Air From Air Compressor Units According to First Embodiment>

Figure 8:
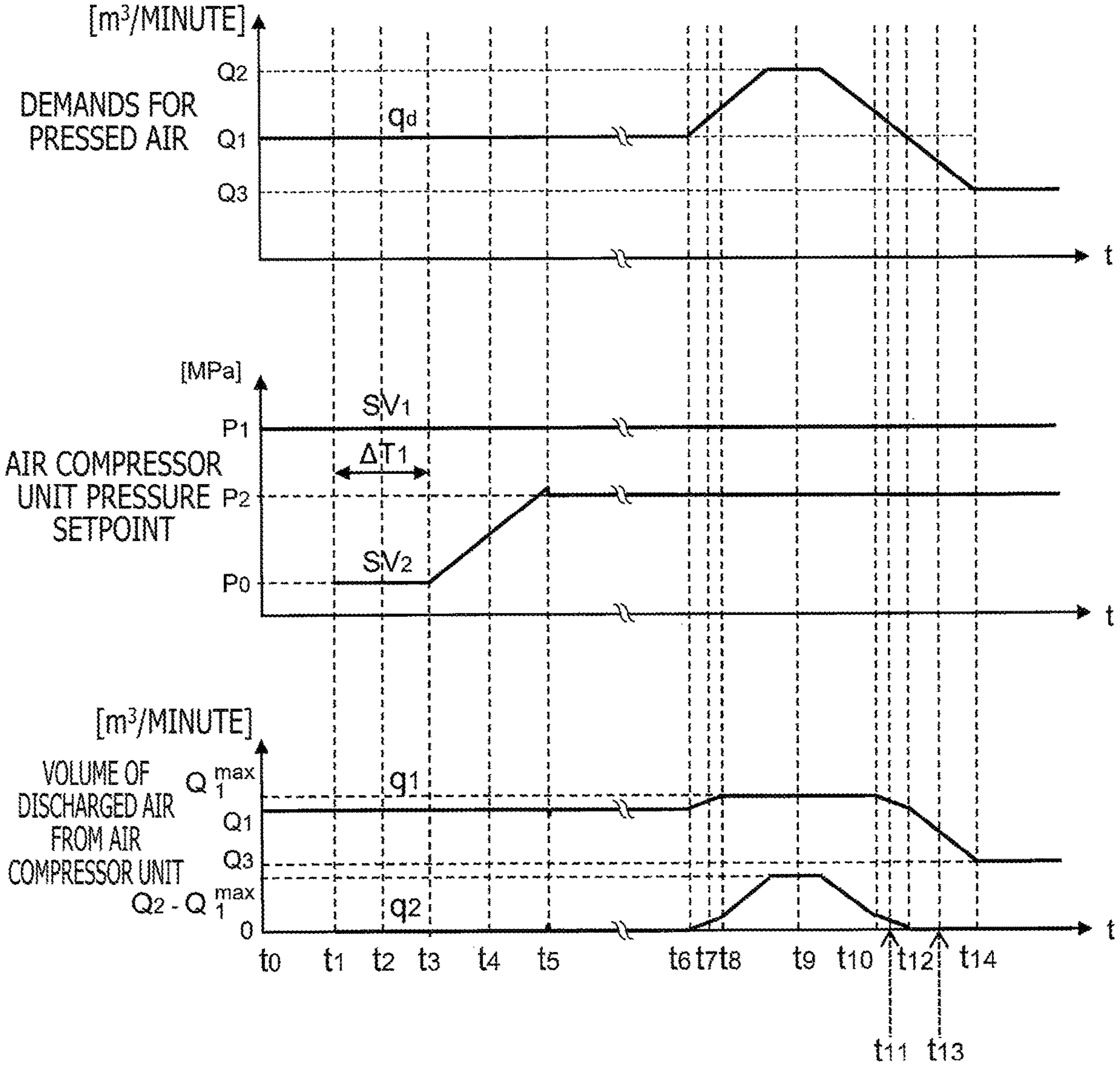
FIG. 8 depicts graphs representing time courses of demands for compressed air, pressures setpoint of air compressor units, and volumes of discharged air from the air compressor units in adjustment of the pressures setpoint according to the first embodiment.

Next, the operations of the adjustor of pressure setpoint 19 described above and operations of the overall compressed air system 1S after and the adjustment of the pressure setpoint (SV) will be described with reference to FIGS. 8 and 9A to 9I. FIG. 8 are graphs depicting time courses of demands for compressed air $q_d$, pressures setpoint $SV_1$ and $SV_2$ of the air compressor units 1_a_ and 1_b_, and volumes of discharged air $q_1$ and $q_2$ from the air compressor units 1_a_ and 1_b_ in the adjustment of the pressures setpoint according to the first embodiment. FIGS. 9A to 9I depict states of pressure values at the air tanks 2_a_ and 2_b_ and the branching point 5 according to the first embodiment.

Figure 9A:
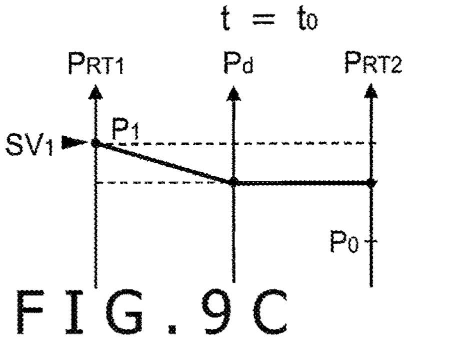
FIGS. 9A to 9I depict states of pressure values at air tanks and a branching point according to the first embodiment.
Figure 9B:
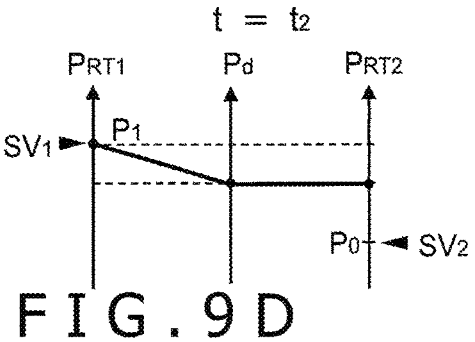

It is assumed that the demands for compressed air $q_d$ are a constant value $Q_1$ from time $t_0$ to $t_6$, then increased to be kept at a constant value $Q_2$, then decreased to $Q_3$, and subsequently kept at the constant value $Q_3$. For such demands for compressed air $q_d$, the air compressor unit 1_a_ is already operating at the time $t_0$, the pressure setpoint $SV_1$ is set to a constant value $P_1$, and a volume of discharged air $q_1$ is $Q_1$ identical to the demands for compressed air $q_d$. Furthermore, it is assumed that the air compressor unit 1_b_ is connected to the compressed air distributions line 4 via the air tank 2_b_ and is not operating yet. FIG. 9A depicts the states of pressures at the air tanks 2_a_ and 2_b_ and a pressure at the branching point 5 on the compressed air distributions line 4 (denoted by $P_{RT1}$, $P_{RT2}$, and $P_d$, respectively), and the pressure setpoint $SV_1$ of the air compressor unit 1_a_ at this time $t_0$.

As depicted in FIG. 9A, the pressure of the air tank 2_a_ is kept at $P_1$ set as the pressure setpoint $SV_1$, and the compressed air is discharged from the air compressor unit 1_a_ toward the compressed air consuming devices 7. At this time, a pressure loss in response to a flow rate of the compressed air from the air tank 2_a_ is generated from the air tank 2_a_ to the branching point 5, and the pressure $P_d$ at the branching point 5 is lower than the pressure $P_{RT1}$ of the air tank 2_a_ as depicted in FIG. 9A.

On the other hand, a volume of discharged air from the air compressor unit 1_b_ and the air tank 2_b_ is zero, and the compressed air conversely flows from the compressed air distributions line 4 to the air tank 2_b_ and is accumulated in the air tank 2_b_. As a result, the pressure of the air tank 2_b_ is equal to the pressure of the branching point 5 in the state depicted in FIG. 9A. Moreover, a flow rate of the compressed air between the branching point 5 and the air tank 2_b_ is also zero.

In such an initial state, when the adjustor of pressure setpoint 19 of the air compressor unit 1_b_ is started at the time $t_1$, then the pressure setpoint $SV_2$ is set to an initial value $P_0$ for the waiting time $\Delta T_1$ in accordance with the adjustment process flow depicted in FIG. 7, and the pressure setpoint $SV_2$ is a value (for example, an atmospheric pressure) sufficiently lower than a pressure value of the air tank 2_b_. Owing to this, a volume of discharged air $q_1$ from the air compressor unit 1_b_ is zero and the same pressure value as that in the initial state is kept at the air compressor unit 1_b_. Therefore, the pressures $P_{RT1}$, $P_{RT2}$ and $P_d$ at the time $t_2$ within this waiting time $\Delta T_1$ are in a state depicted in FIG. 9B.

Figure 9C:
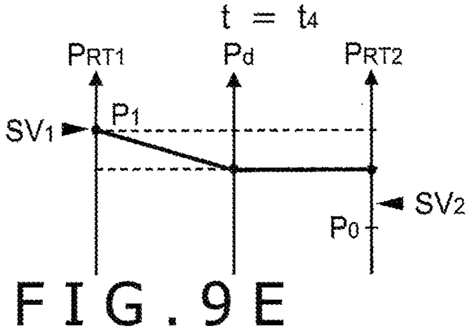

Next, it is assumed that the pressure setpoint $SV_2$ is increased stepwise from the time $t_3$ and that the control variable of the air compressor unit 1_b_ exceeds zero at the time $t_5$. FIG. 9C depicts the state of the pressure values of the air tanks 2_a_ and 2_b_ and the branching point 5 at the time $t_4$ before the time $t_5$. As depicted in FIG. 9C, the pressure setpoint $SV_2$ of the air compressor unit 1_b_ is increased but still lower than the pressure $P_d$ of the branching point 5; thus, the control variable of the air compressor unit 1_b_ is zero and the compressed air is not discharged from the air compressor unit 1_b_. As a result, the pressures $P_{RT1}$, $P_{RT2}$, and $P_d$ are in the same state as that depicted in FIG. 9B.

Figure 9D:
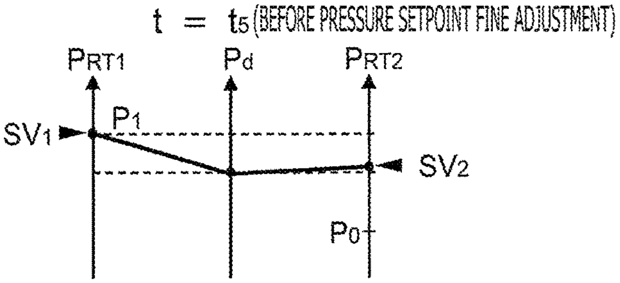

Next, FIG. 9D depicts the state of the pressures $P_{RT1}$, $P_{RT2}$, and $P_d$ of the air tanks 2_a_ and 2_b_ and the branching point 5 at the time $t_5$. At this timing, the pressure setpoint $SV_2$ exceeds the pressure $P_{RT2}$ of the air tank 2_b_; thus, the control variable of the controller of air compressor 17 in the air compressor unit 1_b_ is positive and the air compressor unit 1_b_ starts discharging the compressed air. Further, as depicted in the graphs of FIG. 8, the volume of discharged air from the air compressor unit 1_a_ is reduced by as much as a volume of a flow of the compressed air generated from the air tank 2_b_ to the branching point 5.

However, the pressure setpoint $SV_2$ is finely adjusted and slightly reduced such that the control variable becomes zero by the process performed by the adjustor of pressure setpoint 19 as depicted in Steps S20 and S21 of FIG. 7; thus, the flow rate of the compressed air from the air tank 2_b_ to the branching point 5 is zero. Therefore, the pressures $P_{RT1}$, $P_{RT2}$, and $P_d$ turn into the state depicted in FIG. 9E, and the volume of discharged air from the air compressor unit 1_a_ is returned to $Q_1$ as depicted in FIG. 8. This state corresponds to a state at timing at which the air compressor unit 1_b_ is completed with the pressure setpoint adjustment process.

Changes in the states of the compressed air system 1S when the adjustor of pressure setpoint 19 operates have been described above. Next, operations of the air compressor units 1_a_ and 1_b_ at a time of a subsequent variation in demands for compressed air $q_d$ will be described similarly with reference to FIG. 8.

When the demands for compressed air $q_d$ are increased from $Q_1$ at the time $t_6$ of FIG. 8, pressure losses from the air tanks 2_a_ and 2_b_ are increased and the pressure $P_d$ of the branching point 5 is reduced by as much as an increase in a volume of the compressed air flowing from the air tank 2_a_ to the branching point 5 to cope with the increase in the demands for compressed air $q_d$. As a result, the pressure $P_d$ of the branching point 5 is lower than the pressure $P_{RT2}$ of the air tank 2_b_, and the compressed air also starts to flow from the air tank 2_b_ to the branching point 5. Since the control variable output from the controller of air compressor 17 in the air compressor unit 1_b_ becomes positive to keep the pressure of the air tank 2_b_ to be equal to the pressure setpoint $SV_2$ while compensating for the pressure loss, the air compressor unit lb starts discharging the compressed air. At this time, the air compressor unit 1*b* starts discharging the compressed air only on the basis of the pressure $P_{RT2}$ of the air tank 2*b* and the pressure setpoint $SV_2$, and does not need an instruction from the other device.

Figure 9E:
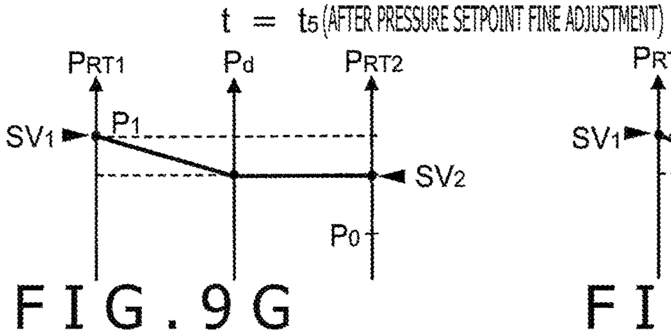
Figure 9F:
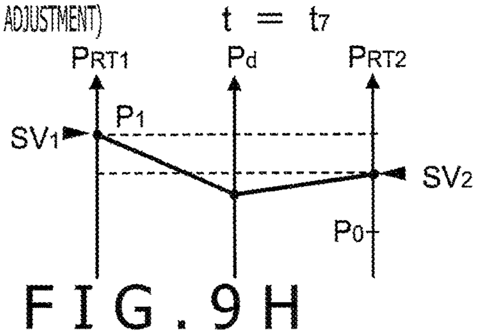

After the air compressor unit 1*b* starts discharging the compressed air, the state of the pressures of the air tanks 2*a* and 2*b* and the branching point 5 at time $t_7$ is depicted in FIG. 9F. At this timing, the pressure losses from the air tanks 2*a* and 2*b* are increased and the pressure $P_d$ of the branching point 5 is reduced by as much as increases in volumes of discharged air from the air compressor units 1*a* and 1*b* to cope with the increase in the demands for compressed air $q_d$ as depicted in FIG. 9F.

Next, at time $t_8$, the volume of discharged air from the air compressor unit 1*a* reaches a maximum volume of discharged air $Q_1^{max}$, and a load of the air compressor unit 1*a* reaches 100%. In addition, when the demands for compressed air $q_d$ are further increased, then the volume of discharged air from the air compressor unit 1*a* becomes constant and, the air compressor unit 1*b* copes with the increase in the demands for compressed air $q_d$. In these circumstances, the state of the air tanks 2*a* and 2*b* and the state of the pressures $P_{RT1}$, $P_{RT2}$, and $P_d$ at time $t_9$ is depicted in FIG. 9G.

Figure 9G:
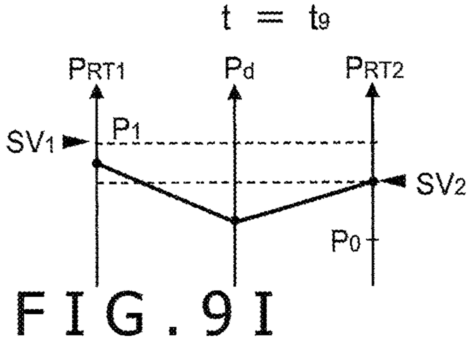

As depicted in FIG. 9G, the pressure losses of the air tanks 2*a* and 2*b* are further increased because of an increase in a volume of the compressed air flowing into the branching point 5. Nevertheless, since the load of the air compressor unit 1*a* already reaches 100%, it is impossible to increase the volume of discharged air $q_1$ from the air compressor unit 1*a* and to keep the pressure of the air tank 2*a;* thus, the pressure of the air tank 2*a* is lower than the value $P_1$ designated as the pressure setpoint $SV_1$. On the other hand, since the volume of discharged air from the air compressor unit 1*b* can be still increased, the volume of compressed air in the air tank 2*b* can be kept at the pressure setpoint $SV_2$.

Figure 9H:
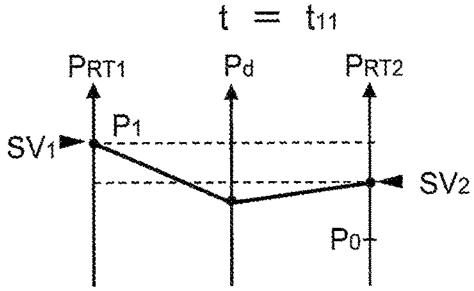

Next, when the demands for compressed air $q_d$ start to be reduced between the time $t_9$ and time $t_{10}$, the volume of discharged air $q_2$ from the air compressor unit 1*a* starts to be reduced. After the time $t_{10}$, the volume of discharged air $q_1$ from the air compressor unit 1*b* also starts to be reduced. The state of the pressures $P_{RT1}$, $P_{RT2}$, and $P_d$ of the air tanks 2*a* and 2*b* and the branching point 5 at this time is depicted in FIG. 9H. Since the demands for compressed air $q_d$ are reduced and the pressure losses of the air tanks 2*a* and 2*b* are also reduced, the pressure $P_d$ of the branching point 5 is increased. In addition, the volume of discharged air from the air compressor unit 1*a* is equal to or lower than the maximum volume of discharged air $Q_1^{max}$, and the pressure value of the air tank 2*a* can be kept at the pressure setpoint $SV_1$.

Figure 9I:
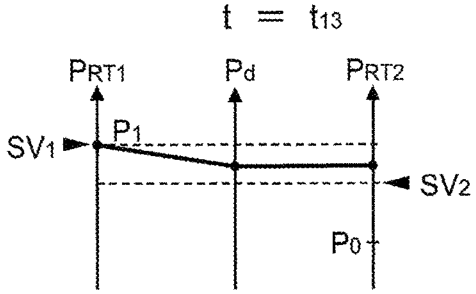

When the demands for compressed air $q_d$ are further reduced, then the pressure value of the branching point 5 is increased, the volume of discharged air $q_2$ from the air compressor unit 1*b* is equal to zero at time $t_{12}$ at which the pressure of the branching point 5 is equal to the pressure setpoint $SV_2$ of the air compressor unit 1*b,* and only the air compressor unit 1*a* is in a state of discharging the compressed air. The state of the pressures $P_{RT1}$, $P_{RT2}$, and $P_d$ of the air tanks 2*a* and 2*b* and the branching point 5 at this time is depicted in FIG. 9I.

As described above, by setting the pressure setpoint determined by a pressure setpoint adjusting method described above to the pressure setpoint $SV_2$ of the air tank 2*b,* the air compressor unit 1*b* discharges the compressed air in the case in which the demands for compressed air exceed the reference that is the demands for compressed air at the time of adjusting the pressure setpoint, and the air compressor unit 1*b* stops discharging the compressed air in the case in which the demands for compressed air are below the reference. Thus, discharge of the compressed air and stop of the discharge of the compressed air from the air compressor units 1*a* and 1*b* are realized in response to the variation in the demands for compressed air.

Furthermore, executing the pressure setpoint adjusting method and setting the pressure setpoint $SV_1$ of the air compressor unit 1*a* when the load of the air compressor unit 1*a* is 100%, that is, when the volume of discharged air $q_1$ is the maximum volume of discharged air enable the air compressor unit 1*b* to discharge the compressed air only while the demands for compressed air $q_d$ exceed the maximum volume of discharged air $Q_1^{max}$ from the air compressor unit 1*a;* thus, the air compressor units 1*a* and 1*b* can operate more efficiently.

According to the present embodiment, it is possible to realize operation and stop of the air compressor units in response to the increase or decrease in the demands for compressed air by disposing the controllers in the air compressor units 1 in a distributed fashion without providing a centralized controller and by autonomously controlling each air compressor unit 1 without communication between the controllers. Furthermore, a cost involved in laying out the communication line is reduced at a time of adding the air compressor unit 1 and it is possible to easily add a new air compressor since it is unnecessary to stop the operating air compressors.

Second Embodiment

A second embodiment will be described with reference to FIGS. 10 to 13A to 13D. It is noted that basic configurations and operations of the devices are similar to those in the first embodiment, the same reference characters are given in FIGS. 10 to 13 as those in the drawings already described, and description of the same configurations and operations will be omitted.

In the present embodiment, in the process performed by the adjustment processing unit 192 of the adjustor of pressure setpoint 19, the pressure setpoint is reduced from the initial pressure setpoint and the pressure setpoint set when the control variable output from the controller of air compressor 17 changes from a positive value to a value equal to or smaller than zero is obtained, as an alternative to increasing the pressure setpoint from the initial pressure setpoint stepwise and obtaining the pressure setpoint set when the control variable output from the controller of air compressor 17 changes from zero to a positive value.

<Adjustment Process According to Second Embodiment>

Figure 10:
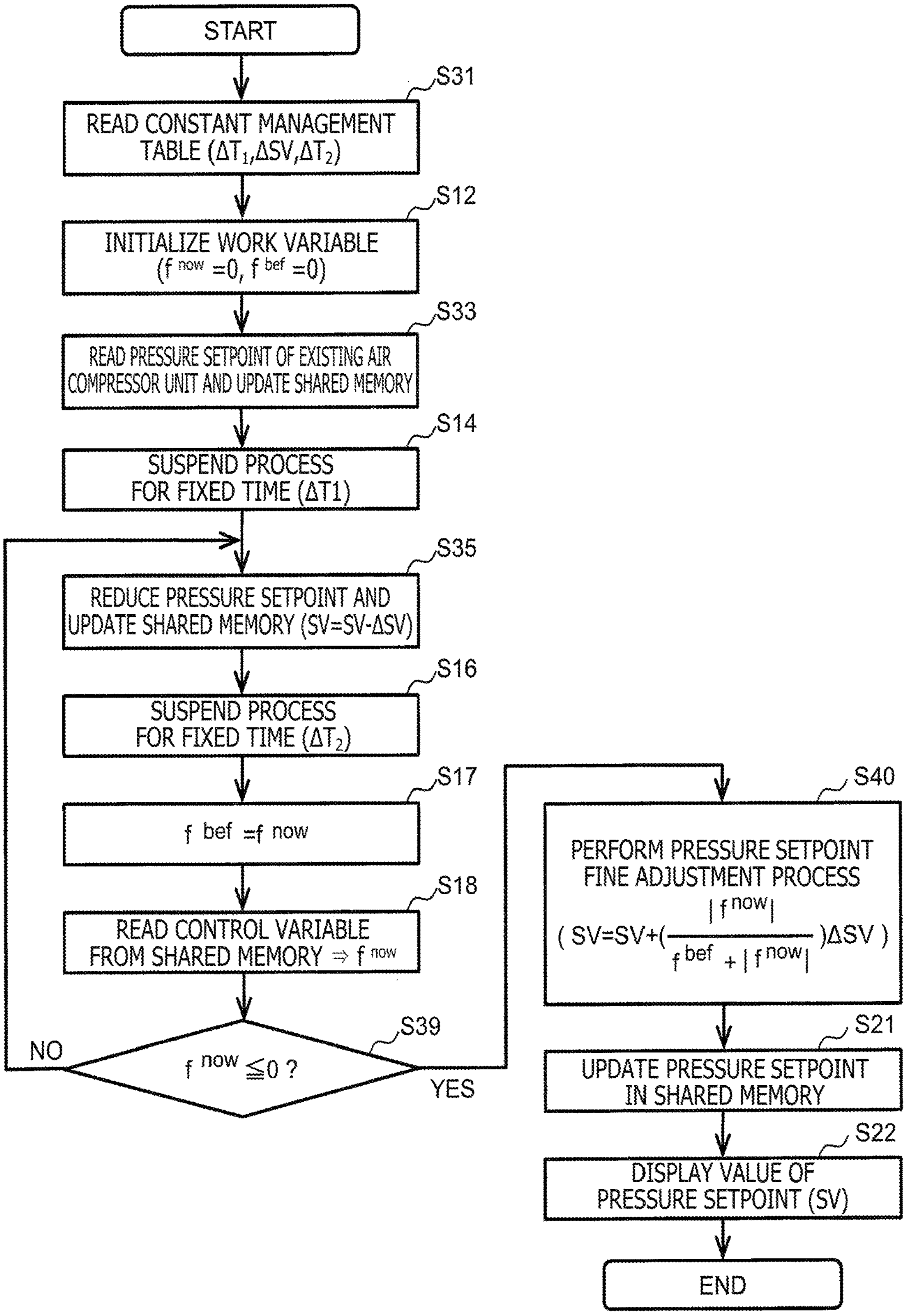
FIG. 10 is a detailed flow of an adjusting process in an adjustor of pressure setpoint according to a second embodiment.

FIG. 10 is a detailed flow of the adjustment process performed by the adjustor of pressure setpoint 19 according to the second embodiment. In description of the detailed flow of the adjustment process according to the present embodiment depicted in FIG. 10, the same process as that in the detailed flow of the adjustment process according to the first embodiment depicted in FIG. 7 is denoted by the same step number and description of the process will be omitted. The present process is started by the input/output device 9.

First, the adjustment processing unit 192 reads, as constants used in the process, the before-adjustment waiting time ($\Delta T_1$), the pressure setpoint update width ($\Delta SV$), and the during-adjustment waiting time ($\Delta T_2$) from the fields 1912 to 1914 of the constant management table 191 (Step S31). The adjustment processing unit 192 executes Step S12 subsequently to Step S31.

Figure 11:
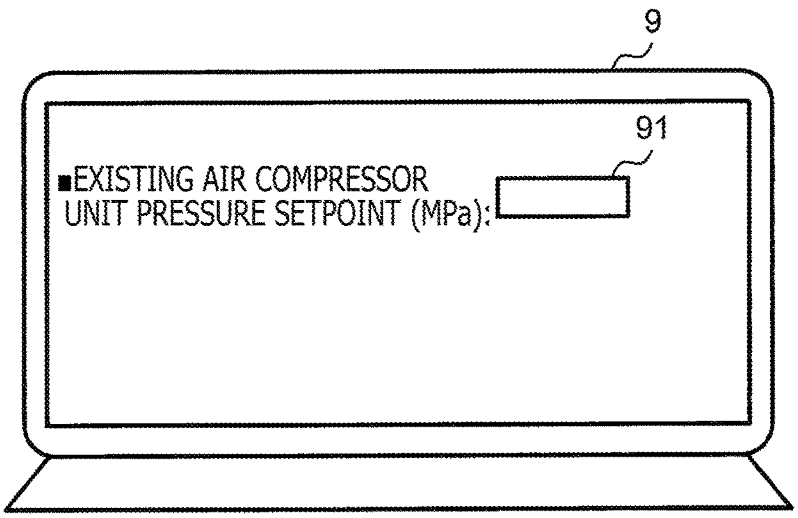
FIG. 11 is a display screen diagram of an input/output device according to the second embodiment.

Subsequently to Step S12, the adjustment processing unit 192 imports the pressure setpoint $SV_1$ of the existing air compressor unit 1*a* as the initial pressure setpoint of the pressure setpoint $SV_2$ of the air compressor unit 1*b*. This is, as depicted in FIG. 11, a process for urging the operator to input a value using the input/output device 9 and importing the value input to a field 91 on an input screen as $SV_1$, and the value is set to the field 181 within the shared memory 18 (Step S33). The pressure setpoint set at this timing is read by the controller of air compressor 17.

The adjustment processing unit 192 executes Step S14 subsequently to Step S33. At this time, the controller of air compressor 17 of the air compressor unit 1*b* sets the control variable to a positive value and controls the air compressor main body 13 to discharge the compressed air to cope with the demands for compressed air while increasing the pressure of the air tank 2*b* to the pressure setpoint $SV_1$. The volume of discharged air from the air compressor unit 1*b* is a value at a certain ratio at which the demands for compressed air are allocated to the air compressor unit 1*a* already discharging the compressed air and the air compressor unit 1*b*. Specifically, this ratio is determined by a position relationship among the air tanks 2*a* and 2*b* and the branching point 5 on the compressed air distributions line 4.

Subsequently to Step S14, the adjustment processing unit 192 updates the field 181 that stores the pressure setpoint within the shared memory 18 to a value reduced by the read pressure setpoint update width (ΔSV) (Step S35). The adjustment processing unit 192 executes Steps S16 to S18 subsequently to Step S35.

The adjustment processing unit 192 then checks whether the value of the latest control variable ($f^{now}$) read in Step S18 is equal to or smaller than zero (Step S39). In a case in which the latest control variable ($f^{now}$) is positive, that is, in a case in which the air compressor unit 1*b* discharges the compressed air (Step S39: NO), the adjustment processing unit 192 returns the process to Step S35, reduces the pressure setpoint by the adjustment width (ΔSV), executes Steps S16 to S18, and checks again whether the latest control variable ($f^{now}$) is equal to or smaller than zero (Step S39).

In this way, the adjustment processing unit 192 reduces the pressure setpoint while the latest control variable ($f^{now}$) is positive. In a case in which the latest control variable ($f^{now}$) is equal to or smaller than zero (Step S39: YES), that is, in a case in which the air compressor unit 1*b* stops discharging the compressed air, the adjustment processing unit 192 finely adjusts the pressure setpoint to a value set when the latest control variable ($f^{now}$) is equal to zero on the basis of the following Equation (2) (Step S40).

[Equation 2]

$$SV = SV + \left(\frac{|f^{now}|}{f^{bef} + |f^{now}|}\right)\Delta S \tag{2}$$

The adjustment processing unit 192 then executes Steps S21 and S22 subsequently to Step S40.

<Time Courses of Demands for Pressed Air, Pressures Setpoint of Air Compressor Units, and Volumes of Discharged Air From Air Compressor Units According to Second Embodiment>

Figure 12:
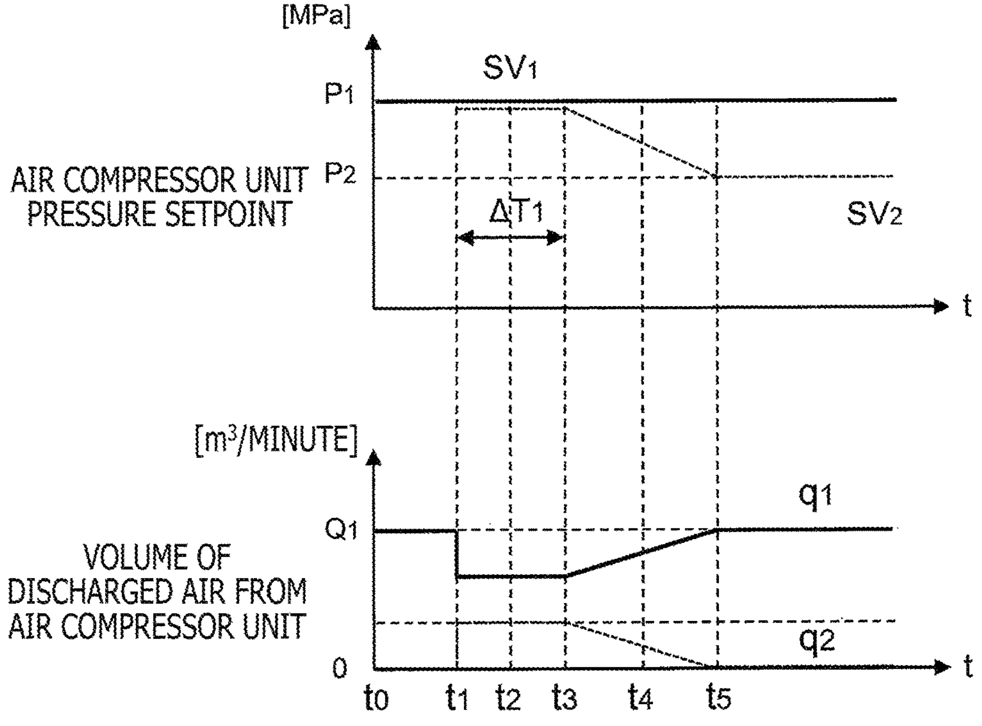
FIG. 12 depicts graphs representing time courses of pressures setpoint of air compressor units and volumes of discharged air from the air compressor units in adjustment of the pressure setpoint according to the second embodiment.

Next, the operations of the adjustor of pressure setpoint 19 described above and operations of the overall compressed air system 1S after and the adjustment of the pressure setpoint (SV) will be described with reference to FIGS. 12 and 13A to 13D. FIG. 12 are graphs depicting time courses of pressures setpoint $SV_1$ and $SV_2$ of the air compressor units 1*a* and 1*b*, and volumes of discharged air $q_1$ and $q_2$ from the air compressor units 1*a* and 1*b* in a case in which the demands for compressed air of the compressed air consuming devices 7 are the constant value $Q_1$ in the adjustment of the pressures setpoint according to the second embodiment. FIGS. 13A to 13D depict states of pressure values of the air tanks 2*a* and 2*b* and the branching point 5 according to the second embodiment.

As depicted in FIG. 12, the air compressor unit 1*a* is already operating at timing of the time $t_0$, the pressure setpoint $SV_1$ is set to the constant value $P_1$, and the volume of discharged air $q_1$ is identical to demands for compressed air $q_d$, that is, $q_1$ is set to $Q_1$.

When the adjustor of pressure setpoint 19 of the air compressor unit 1*b* is started at this time $t_1$, then the pressure setpoint $SV_2$ is kept at the same value $P_1$ as the pressure setpoint $SV_1$ of the air compressor unit 1*a* for the waiting time $\Delta T_1$ in accordance with the adjustment process according to the second embodiment. The state of the pressures (denoted by $P_{RT1}$, $P_{RT2}$, and $P_d$, respectively, similarly to FIGS. 9A to 9I) of the air tanks 2*a* and 2*b* and the branching point 5 on the compressed air distributions line 4 and the pressures setpoint $SV_1$ and $SV_2$ of the air compressor units 1*a* and 1*b* at the time $t_2$ within this waiting $\Delta T_1$ is depicted in FIG. 13A.

Figure 13A:
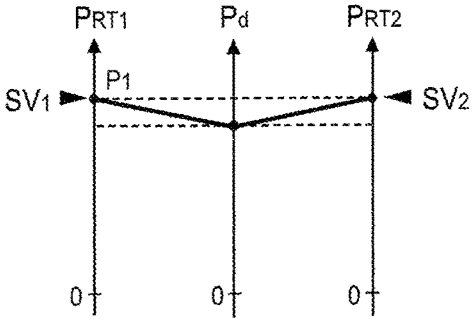
FIGS. 13A to 13D depict states of pressure values at air tanks and a branching point according to the second embodiment.

As depicted in FIG. 13A, the pressures setpoint $SV_1$ and $SV_2$ of the air tanks 2*a* and 2*b* are set to the same value of $P_1$, the pressures of the air tanks 2*a* and 2*b* are also kept at the value $P_1$, and the compressed air is discharged toward the compressed air consuming devices 7. The volumes of discharged air $q_1$ and $q_2$ from the air compressor units 1*a* and 1*b* at this time are set to values at the certain ratio at which the demands for compressed air $q_d$ are allocated to the air compressor units 1*a* and 1*b*.

Figure 13B:
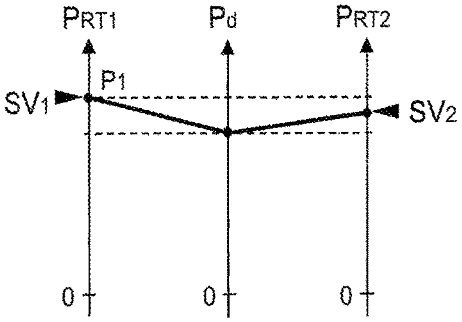

Next, it is assumed that the pressure setpoint $SV_2$ is reduced stepwise at the time $t_3$, and that the control variable of the controller of air compressor 17 of the air compressor unit 1*b* is equal to or smaller than zero at the time $t_5$. At this time, the state of the pressure values of the air tanks 2*a* and 2*b* and the branching point 5 at the time $t_4$ before the time $t_5$ is depicted in FIG. 13B. As depicted in FIG. 13B, the pressure setpoint $SV_2$ of the air compressor unit 1*b* is reduced but still higher than the pressure $P_d$ at the branching point 5; thus, the control variable output from the controller of air compressor 17 of the air compressor unit 1*b* is positive and the compressed air is discharged from the air compressor unit 1*b*.

Figure 13C:
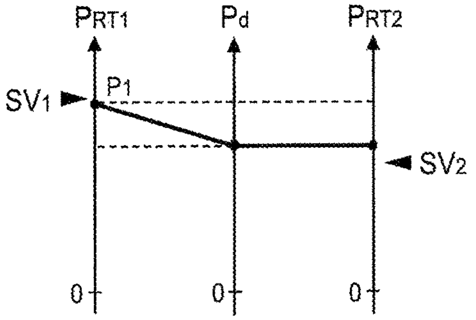
Figure 13D:
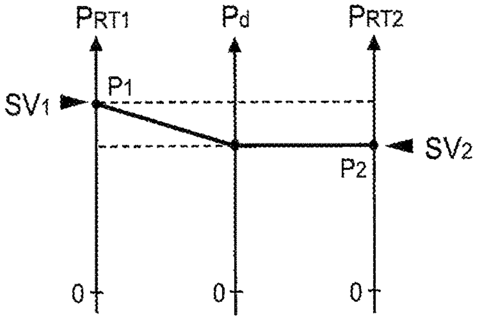

Next, the state of the pressures $P_{RT1}$, $P_{RT2}$, and $P_d$ of the air tanks 2*a* and 2*b* and the branching point 5 at the timing of the time $t_5$ is depicted in FIG. 13C. At this timing, the pressure setpoint $SV_2$ is below the pressure $P_{RT2}$ of the air tank 2*b;* thus, the control variable output from the controller of air compressor 17 of the air compressor unit 1*b* is negative and the discharge of the compressed air from the air compressor unit 1*b* is stopped. However, the pressure setpoint $SV_2$ is finely adjusted and slightly increased such that the control variable becomes zero by the process performed by the adjustor of pressure setpoint 19 as depicted in Steps S40 and S21 of FIG. 10, the flow rate of the compressed air from the air tank 2*b* to the branching point 5 is zero, and the state of the pressures $P_{RT1}$, $P_{RT2}$, and $P_d$ is as depicted in FIG. 13D. Furthermore, the volume of discharged air $q_1$ from the air compressor unit 1*a* is returned to $Q_1$ as depicted in FIG. 12. This state corresponds to a state at timing at which the air compressor unit 1*b* is completed with the pressure setpoint adjustment process.

The state of FIG. 13D is the same as the that (FIG. 9E) after fine adjustment of the pressure setpoint in the first embodiment, the air compressor unit 1*b* discharges the compressed air in the case in which the demands for compressed air exceed the reference that is the demands for compressed air $Q_d$ at the time of adjusting the pressure setpoint, and the air compressor unit 1*b* stops discharging the compressed air in the case in which the demands for compressed air are below the reference. Thus, the discharge of the compressed air and the stop of the discharge of the compressed air from the air compressor units 1*a* and 1*b* are realized in response to the variation in the demands for compressed air.

Third Embodiment

A third embodiment will be described with reference to FIGS. 14 to 16. It is noted that basic configurations and operations of the devices are similar to those in the second embodiment, the same reference characters are given in FIGS. 14 to 16 as those in the drawings already described, and description of the same configurations and operations will be omitted.

In the second embodiment, the demands for compressed air at the time of adjusting the pressure setpoint are assumed as the reference for the start and stop of the discharge of the compressed air from the air compressor unit 1*b*. However, even with the demands for compressed air increased to be higher than the reference, only the existing air compressor unit 1*a* can cope with the demands for compressed air in a case in which the volume of discharged air from the air compressor unit 1*a* does not reach the maximum volume of discharged air. In the present embodiment, therefore, a pressure setpoint setting method that enables the air compressor unit 1 to operate more efficiently without waste in such a manner that the air compressor unit 1*b* starts discharging the compressed air at timing at which the volume of discharged air from the air compressor unit 1*a* is equal to the maximum volume of discharged air, that is, the load of the air compressor unit 1*a* is 100% and the demands for compressed air are further increased will be described.

In the present embodiment, similarly to the second embodiment, first, the pressure setpoint $SV_2$ of the air compressor unit 1*b* to be added is set to the same value as the pressure setpoint $SV_1$ of the existing air compressor unit 1*a*. At this time, as described in the second embodiment, the air compressor unit 1*b* also starts discharging the compressed air and the demands for compressed air are shared between the two air compressor units 1. It is noted herein that the pressure loss is generated due to the flow of the compressed air from the air tank 2*a* to the branching point 5 (the volumes of discharged air from the two air compressor units 1*a* and 1*b* at this time are assumed as $Q_1$ and $Q_2$, respectively), and it is known that a magnitude of the pressure loss is proportional to a square of the volume of the air $Q_1$ (Darcy & Weisbach equation).

In the present embodiment, therefore, this proportional constant will be referred to as "pressure loss factor" and pressure loss factors from the air tanks 2*a* and 2*b* to the branching point 5 are assumed as $K_1$ and $K_2$, respectively. The pressure loss factors are determined depending on a shape (an inside diameter, a length, and the like) and a material of a line, and it is assumed in the present embodiment that a system operator calculates the pressure loss factors in advance from a configuration of the compressed air distributions line 4.

Here, the pressure of the air tank 2*a* is controlled by the pressure setpoint $SV_1$ thereof. Therefore, the pressure $P_d$ of the branching point 5 is obtained by subtracting a pressure loss from the air tank 2*a* to the branching point 5 from the pressure setpoint $SV_1$ of the air tank 2*a*, and the following Equation (3) is established.

[Equation 3]

$$P_d = SV_1 - K_1 Q_1^2 \tag{3}$$

Likewise, the pressure of the air tank 2*b* is controlled by the pressure setpoint $SV_2$ thereof. Therefore, the pressure $P_d$ at the branching point 5 is obtained by subtracting a pressure loss from the air tank 2*b* to the branching point 5 from the pressure setpoint $SV_2$ of the air tank 2*b*, and the following Equation (4) is established.

[Equation 4]

$$P_d = SV_2 - K_2 Q_2^2 \tag{4}$$

Here, since the pressures setpoint of the two air compressor units 1*a* and 1*b* are set equal, the following Equation (5) is established.

[Equation 5]

$$SV_1 = SV_2 \tag{5}$$

The following Equation (6) is derived from the Equations (3), (4), and (5).

[Equation 6]

$$Q_1 = \sqrt{\frac{K_2}{K_1}} Q_2 \tag{6}$$

The demands for compressed air $Q_d$ are a sum of the volumes of discharged air $Q_1$ and $Q_2$ from the air compressor units 1*a* and 1*b* and expressed by the following Equation (7) from the Equation (6).

[Equation 7]

$$Q_d = Q_1 + Q_2 = \left(1 + \sqrt{\frac{K_2}{K_1}}\right) Q_2 \tag{7}$$

Next, the state at the timing of completion with the adjustment of the pressure setpoint is a state depicted in time $t_5$ of FIG. 12, only the air compressor unit 1*a* copes with the demands for compressed air and the volume of discharged air $Q_1$ from the air compressor unit 1*a*, therefore, is equal to the demands for compressed air $Q_d$. Furthermore, as depicted in FIG. 13D, the pressure setpoint $SV_2$ of the air compressor unit 1*b* is equal to the pressure $P_d$ of the branching point 5. Therefore, a difference between the obtained pressures setpoint $SV_1$ and $SV_2$ of the air compressor units 1*a* and 1*b* corresponds to a pressure loss (assumed as $\Delta P$) between the air tank 2*a* and the branching point 5, and the following Equation (8) is established using the pressure loss factor.

[Equation 8]

$$SV_1 - SV_2 = \Delta P = K_1 Q_d^2 \tag{8}$$

Next, a pressure loss $\Delta P_{max}$ from the air tank 2*a* to the branching point 5 when the air compressor unit 1*a* discharges the maximum volume of discharged air $Q_1^{max}$ can be expressed by the following Equation (9).

[Equation 9]

$$\Delta P_{max}=K_1(Q_1^{max})^2 \quad (9)$$

By setting the pressure setpoint $SV_2$ of the air compressor unit 1*b* to a value obtained by subtracting this pressure loss $\Delta P_{max}$ from the pressure setpoint $SV_1$ of the air compressor unit 1*a*, the air compressor unit 1*b* starts discharging the compressed air at the timing at which the demands for compressed air exceed the maximum volume of discharged air from the air compressor unit 1*a*. Here, the following Equation (10) is derived from Equations (7), (8), and (9).

[Equation 10]

$$\frac{\Delta P_{max}}{\Delta P}=\left(\frac{Q_1^{max}}{Q_2}\right)^2\left(1+\sqrt{\frac{K_2}{K_1}}\right)^{-2} \quad (10)$$

In Expression (10), $Q_2$ denotes the volume of discharged air from the air compressor unit 1*b* when the pressures setpoint of the two air compressor units 1*a* and 1*b* are equal, and the volume of discharged air $Q_2$ can be obtained by proportional calculation expressed by the following Equation (11) using the control variable output from the controller of air compressor 17 to the inverter 16, that is, a rotational frequency $f_2$, and a rotational frequency (assumed as maximum rotational frequency $f_2^{max}$) when the maximum volume of discharged air $Q_2^{max}$ is discharged from the air compressor unit 1*b*.

[Equation 11]

$$Q_2=Q_2^{max}\left(\frac{f_2}{f_2^{max}}\right) \quad (11)$$

The following Equation (12) is derived from Equations (10) and (11).

[Equation 12]

$$\Delta P_{max}=\Delta P\left(\frac{f_2^{max}}{f_2}\right)^2\left(\frac{Q_1^{max}}{Q_2^{max}}\right)^2\left(1+\sqrt{\frac{K_2}{K_1}}\right)^{-2} \quad (12)$$

Therefore, in the adjustment of the pressure setpoint depicted in FIG. 12, the control variable $f_2$ of the air compressor unit 1*b* may be stored at appropriate timing from time $t_1$ to $t_3$ at which the pressures setpoint of the air compressor units 1*a* and 1*b* are equal, the pressure loss $\Delta P$ from the air tank 2*a* to the branching point 5 at that next time $t_3$ to $t_5$ may be obtained from the difference between the pressure setpoint $SV_2$ of the air compressor unit 1*b* and the pressure setpoint $SV_1$ of the air compressor unit 1*a* obtained by the adjusting from the next time $t_3$ to $t_5$, the pressure loss $\Delta P_{max}$ may be obtained from Equation (12), and the final pressure setpoint may be obtained and set from the following Equation (13).

[Equation 13]

$$SV_2=SV_1-\Delta P_{max} \quad (13)$$

It is noted that the pressure loss factor of the same line is proportional to the length of the line. Therefore, in the Equation (12), a pressure loss factor ratio $K_2/K_1$ can be replaced by a ratio $L_2/L_1$ of a ratio of a distance between the air tank 2*b* to the branching point 5 to a distance between the air tank 2*a* to the branching point 5 (assumed as $L_2$ and $L_1$, respectively).

<Adjustment Process According to Third Embodiment>

Figure 14:
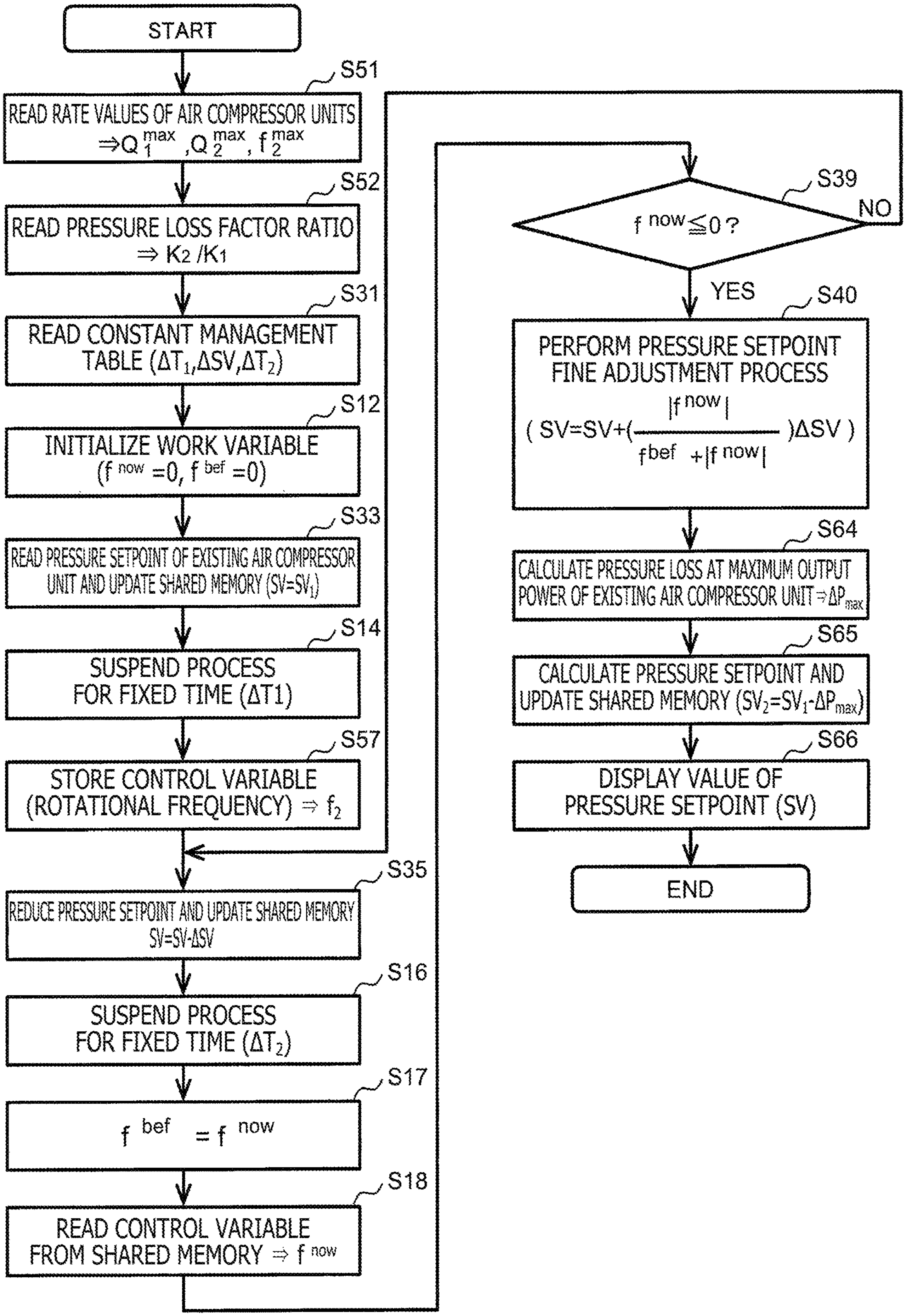
FIG. 14 is a detailed flow of an adjusting process in an adjustor of pressure setpoint according to a third embodiment.
Figure 15:
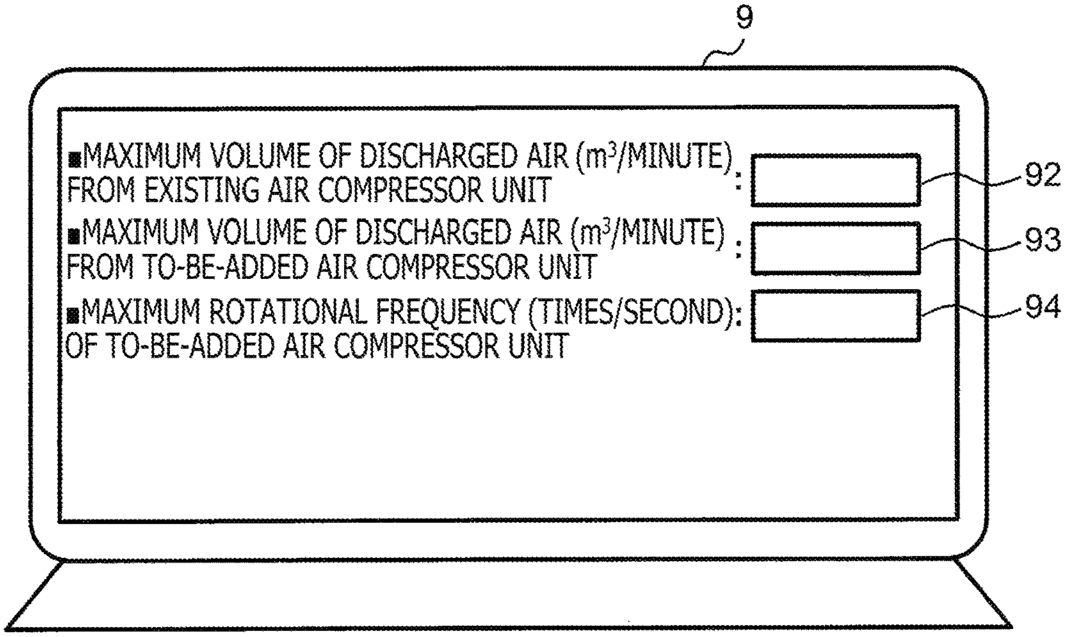
FIG. 15 is a display screen diagram of an input/output device according to the third embodiment.

FIG. 14 is a detailed flow of the adjustment process performed by the adjustor of pressure setpoint 19 according to the third embodiment. In description of the detailed flow of the adjustment process according to the present embodiment depicted in FIG. 14, the same process as that in the detailed flow of the adjustment process according to the first embodiment depicted in FIG. 7 or the same process as that in the detailed flow of the adjustment process according to the second embodiment depicted in FIG. 10 is denoted by the same step number and description of the process will be omitted. The present process is started by the input/output device 9.

First, the adjustment processing unit 192 reads the maximum volumes of discharged air $Q_1^{max}$ and $Q_2^{max}$ from the air compressor units 1*a* and 1*b* and the maximum rotational frequency $f_2^{max}$ of the air compressor unit 1*b*, from the input/output device 9 (Step S51). These are rated values of the air compressor units 1*a* and 1*b*, and are information acquired by a manual or the like. As depicted in FIG. 15, the operator is urged to input values using the input/output device 9 and the adjustment processing unit 192 reads the values input to fields 92, 93, and 94 on the input screen as $Q_1^{max}$, Q2$^{max}$, and $f_2^{max}$.

Figure 16:
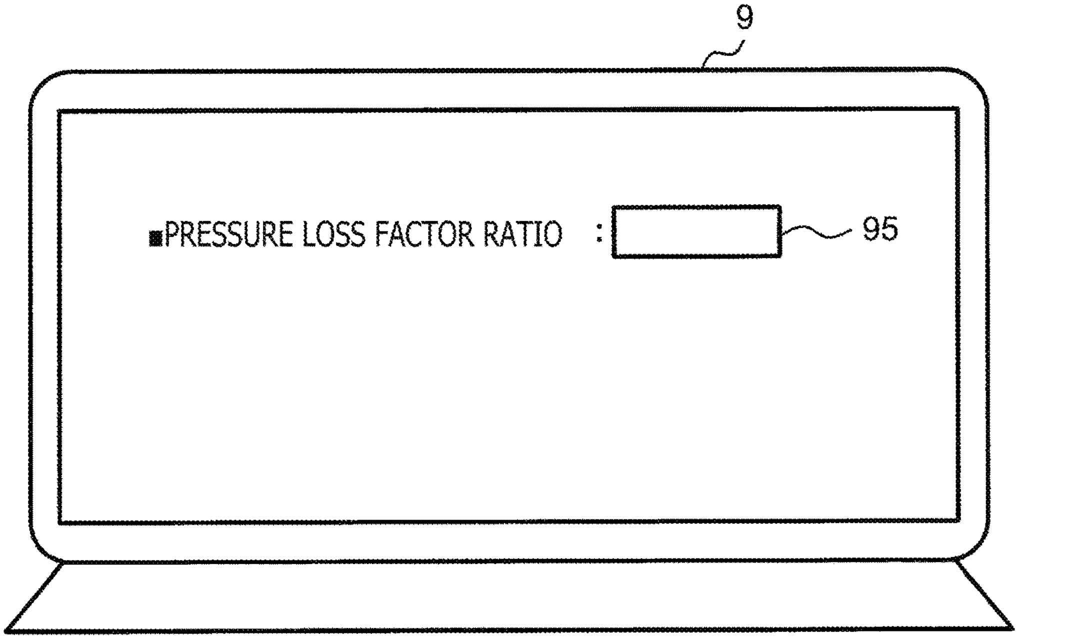
FIG. 16 is a display screen diagram of the input/output device according to the third embodiment.

Next, to read the pressure loss factor, the adjustment processing unit 192 similarly urges the operator to input values using the input/output device 9 as depicted in FIG. 16, and reads the value input to a field 95 on the input screen as the pressure loss factor ratio $K_2/K_1$ (Step S52). The adjustment processing unit 192 sequentially executes Steps S31, S12, S33, and S14 subsequently to Step S52.

Next, subsequently to Step S14, the adjustment processing unit 192 reads the control variable output from the controller of air compressor 17, that is, the rotational frequency $f_2$ of the inverter 16 at that timing from the field 182 within the shared memory 18 of the air compressor unit 1*b* (Step S57). Subsequently to Step S57, the adjustment processing unit 192 sequentially executes Steps S35, S16, S17, S18, S39, and S40.

Next, subsequently to Step S40, the adjustment processing unit 192 obtains the pressure loss $\Delta P$ that is the difference between the pressure setpoint SV corrected in Step S40 and the pressure setpoint $SV_1$ of the air compressor unit 1*a*, and calculates the pressure loss $\Delta P_{max}$ when the existing air compressor unit la discharges the maximum volume of discharged air from Equation (12) (Step S64).

Next, subsequently to Step S64, the adjustment processing unit 192 calculates the pressure setpoint $SV_2$ of the air compressor unit 1*b* from the Equation (13) and updates the shared memory 18 (Step S65), displays the value of the pressure setpoint $SV_2$ on the input/output device 9 (Step S66), and ends the process.

By performing the adjustment of the pressure setpoint described above, the following operation is realized without an instruction from the other device. Only the air compressor unit 1*a* copes with the increase in the demands for compressed air in a case in which the demands for compressed air are within the maximum volume of discharged air from the air compressor unit 1*a*, and the air compressor unit 1*b* also discharges the compressed air only in a case in which the demands for compressed air exceed the maximum volume of discharged air from the air compressor unit 1*a*.

Fourth Embodiment

A fourth embodiment will be described with reference to FIGS. 17 to 19. It is noted that basic configurations and operations of the devices are similar to those in the first embodiment, the same reference characters are given in FIGS. 10 to 13 as those in the drawings already described, and description of the same configurations and operations will be omitted.

In the first embodiment, the pressure setpoint of the air compressor unit 1*b* is increased from the initial pressure setpoint stepwise and the pressure setpoint set when the control variable output from the controller of air compressor 17 changes from zero to the positive value is assumed as a setting value. At this time, the pressure of the branching point 5 is the value obtained by subtracting the pressure loss from the air tank 2*a* to the branching point 5 from the pressure of the air tank 2*a* as depicted in FIG. 9E. On the other hand, since the volume of discharged air from the air compressor unit 1*b* and the air tank 2*b* is zero and there is no flow of the compressed air between the branching point 5 and the air tank 2*b*, the pressure loss is not generated, the pressure of the air tank 2*b* is equal to the pressure of the branching point 5, and the state of the pressures is the same as that depicted in FIG. 9A. In the present embodiment, therefore, the pressure value of the air tank 2*b* is measured in a state in which the air compressor unit 1*b* does not discharge the compressed air and the measured value is set as the pressure setpoint of the air compressor unit 1*b*, as an alternative to adjusting the pressure setpoint by either increasing or reducing the pressure setpoint.

<Configuration of Adjustor of Pressure Setpoint According to Fourth Embodiment>

Figure 17:
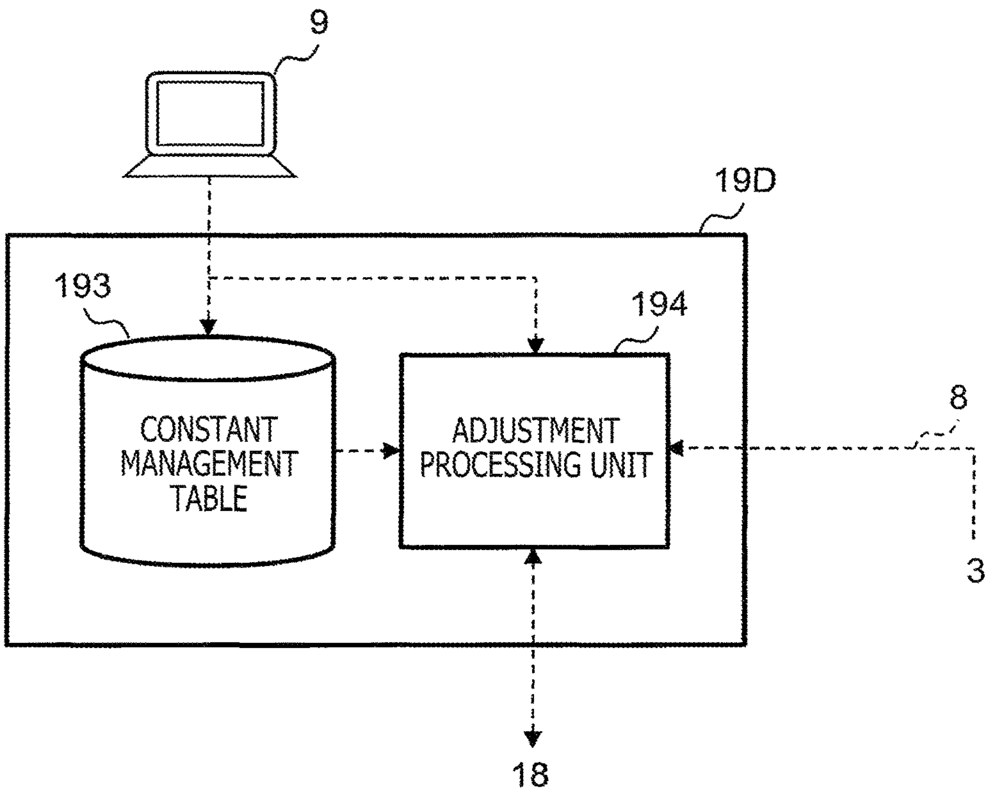
FIG. 17 is a schematic configuration diagram of an adjustor of pressure setpoint according to a fourth embodiment.

FIG. 17 is a schematic configuration diagram of an adjustor of pressure setpoint 19D according to the fourth embodiment. FIG. 18 is a detailed configuration diagram of a constant management table 193 according to the fourth embodiment. The adjustor of pressure setpoint 19D is configured with the constant management table 193 and an adjustment processing unit 194. Furthermore, the signal line 8 from the pressure sensor 3 installed in the air tank 2 is connected to not only the controller of air compressor 17 but also the adjustor of pressure setpoint 19D, and the adjustment processing unit 194 can measure the pressure value of the air tank 2.

Figure 18:
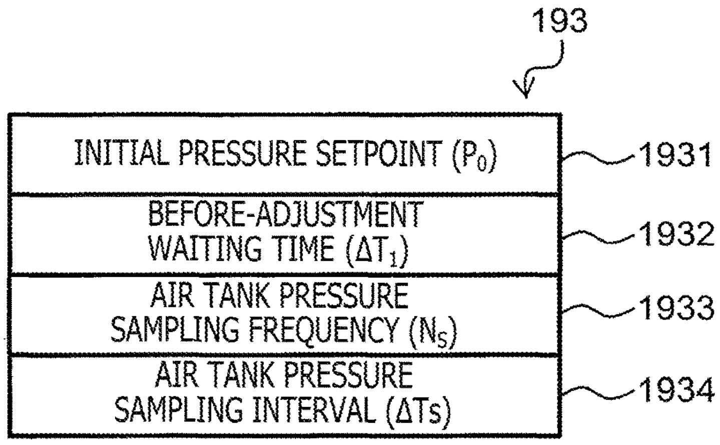
FIG. 18 is a detailed configuration diagram of a constant management table according to the fourth embodiment.

As depicted in FIG. 18, the constant management table 193 is configured with a field 1931 that stores the initial pressure setpoint ($P_0$), a field 1932 that stores the before-adjustment waiting time ($\Delta T_1$) since the adjustor of pressure setpoint 19D is started until the adjustor of pressure setpoint 19D starts adjusting the pressure setpoint, a field 1933 that stores an air tank pressure sampling frequency ($N_S$) when the adjustment processing unit 194 measures the value of the pressure sensor 3 of the air tank 2, and a field 1934 that stores an air tank pressure sampling interval ($\Delta T_s$). Values of these fields are input and set by the input/output device 9 at the time of installing or shipping the air compressor unit 1. It is assumed in the present embodiment that the initial pressure setpoint ($P_0$) in the field 1931 is sufficiently smaller than the air tank pressure setpoint value of the already operating air compressor unit 1*a* and is, for example, the atmospheric pressure (approximately 0.1 Mpa).

<Adjustment Process According to Fourth Embodiment>

Figure 19:
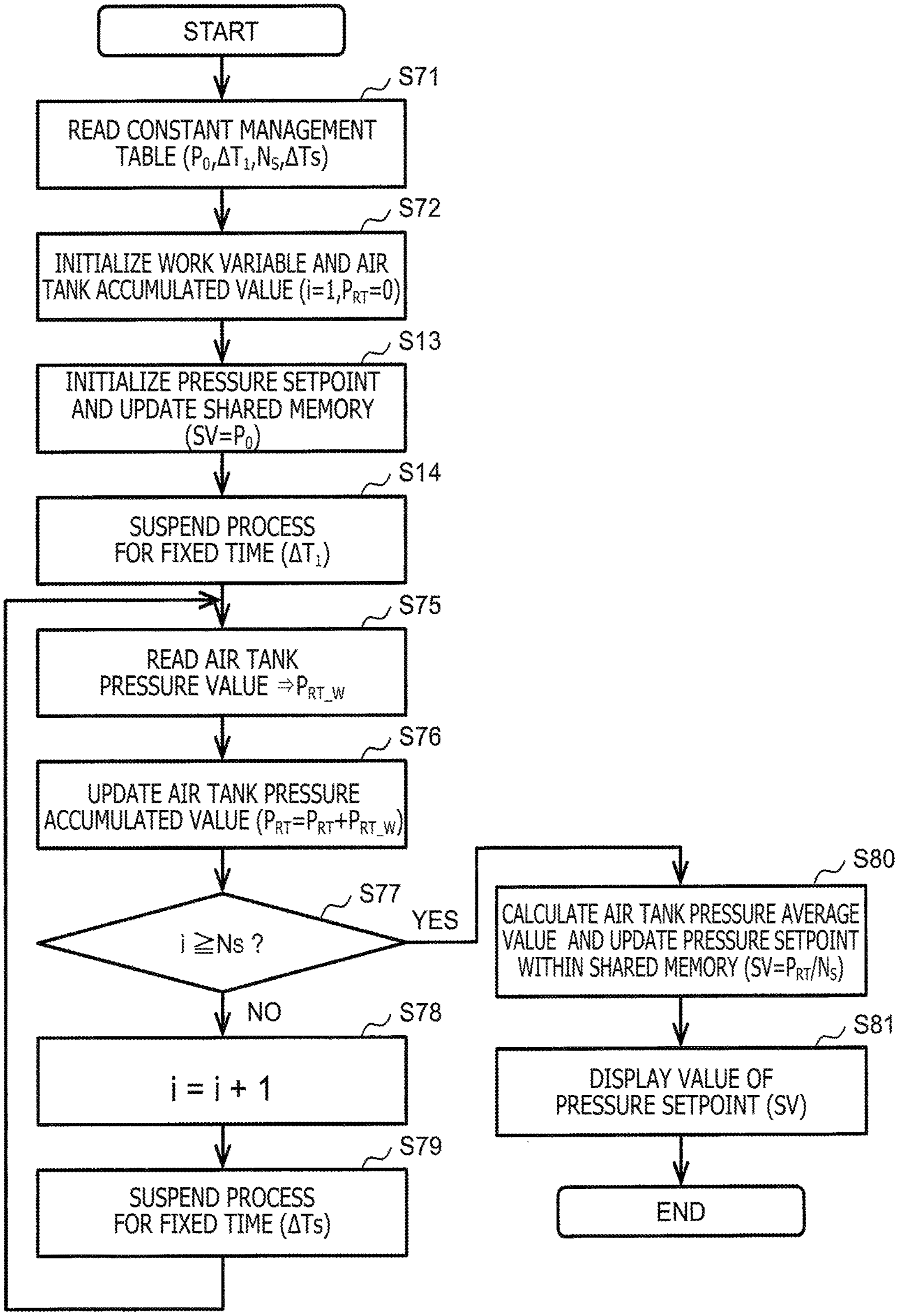
FIG. 19 is a detailed flow of an adjusting process in the adjustor of pressure setpoint according to the fourth embodiment.

FIG. 19 is a detailed flow of the adjustment process performed by the adjustor of pressure setpoint 19D according to the fourth embodiment. In description of the detailed flow of the adjustment process according to the present embodiment depicted in FIG. 19, the same process as that in the detailed flow of the adjustment process according to the first embodiment depicted in FIG. 7 is denoted by the same step number and description of the process will be omitted. The present process is started by the input/output device 9.

First, the adjustment processing unit 194 reads, as constants used in the process, the initial pressure setpoint ($P_0$), the before-adjustment waiting time ($\Delta T_1$), the air tank pressure sampling frequency ($N_S$), and the air tank pressure sampling interval ($\Delta T_s$) from the fields 1931 to 1934 of the constant management table 193 (Step S71).

Next, the adjustment processing unit 194 clears a work variable (counter variable i) and a variable ($P_{RT}$) for storing an air tank pressure accumulated value per sampling to zero to initialize the variables (i and $P_{RT}$) (Step S72). Subsequently to Step S72, the adjustment processing unit 194 executes Steps S13 and S14.

Next, subsequently to Step S14, the adjustment processing unit 194 reads the measurement value of the pressure sensor 3 to the work variable $P_{RT\_W}$ (Step S75), and adds the work variable $P_{RT\_W}$ to the air tank pressure accumulated value $P_{RT}$ (Step S76). Next, the adjustment processing unit 194 compares a value of the counter variable i with the sampling frequency ($N_S$), thereby checking whether air tank pressure sampling has been carried out by a predetermined sampling frequency ($N_S$) (Step S77). In a case of counter variable $i<N_S$ (Step S77: NO), the adjustment processing unit 194 increments the counter variable i by 1 (Step S78), suspends the process for the air tank pressure sampling interval ($\Delta T_s$) (Step S79), and returns the process to Step S75 for a next sampling process.

On the other hand, in a case of counter variable $i \geq N_S$ (Step S77: YES), the adjustment processing unit 194 determines that the air tank pressure sampling has been carried out by the sampling frequency ($N_S$) and, therefore, calculates an average value by dividing the air tank pressure accumulated value $P_{RT}$ measured so far by the sampling frequency $N_S$. Furthermore, the adjustment processing unit 194 writes the calculated average value to the field 181 within the shared memory 18 as the pressure setpoint to update the setpoint pressure within the shared memory 18 (Step S80). The adjustment processing unit 194 then displays the pressure setpoint calculated in Step S80 on the input/output device 9 (Step S81) and ends the process.

The average value of the measurement values of the pressure sensor 3 is calculated and set as the pressure setpoint in the process described above in the light of eliminating an influence of a minute variation in the air tank pressure. As described above, by setting the setpoint pressure determined by the pressure setpoint adjusting method described above to the pressure setpoint $SV_2$ of the air tank 2*b*, the air compressor unit 1*b* discharges the compressed air in the case in which the demands for compressed air exceed the reference that is the demands for compressed air at the time of adjusting the pressure setpoint, and the air compressor unit 1*b* stops discharging the compressed air in the case in which the demands for compressed air are below the reference. Thus, the discharge of the compressed air and the stop of the discharge of the compressed air from the air compressor unit 1*b* are realized in response to the variation in the demands for compressed air.

Fifth Embodiment

A fifth embodiment will be described with reference to FIGS. 20 to 24. It is noted that basic configurations and operations of the devices are similar to those in the first and fourth embodiments, the same reference characters are given in FIGS. 20 to 24 as those in the drawings already described, and description of the same configurations and operations will be omitted.

In the fourth embodiment, the pressure value of the air tank 2*b* is sampled from the pressure sensor 3 a plurality of times in the state in which the air compressor unit 1*b* does not discharge the compressed air, the average value of the pressure values is calculated, and the average value is set as the pressure setpoint of the air compressor unit 1*b*. This setpoint pressure value is the pressure setpoint for realizing the start and the stop of the discharge of the compressed air from the air compressor unit lb with the value set as the reference for a fixed case except for the minute variation in the demands for compressed air of the compressed air consuming devices 7.

By contrast, it is possible to reduce unnecessary operation of the air compressor unit 1*a* and realize energy conservation by causing only the air compressor unit 1*a* to cope with the demands for compressed air as much as possible in circumstances in which the demands for compressed air vary with time, and by causing the air compressor unit 1*b* to start discharging the compressed air and to share the load when the demands for compressed air reach a maximum value in a last fixed period.

In the present embodiment, therefore, the sampling of the air tank pressure described in the fourth embodiment is repeated at certain time intervals for, for example, 24 hours, the sampled pressure value of the air tank 2*b* is logged every time, and a minimum pressure value is then selected from among the logged pressures and set as the pressure setpoint of the air compressor unit 1*b*. This is based on the fact that the flow rate of the compressed air from the air tank 2*a* to the branching point 5 becomes a maximum, the pressure loss also becomes a maximum, the pressure value of the branching point 5 becomes a minimum, and the pressure of the air tank 2*b* that is the same as the pressure of the branching point 5 becomes a minimum when the demands for compressed air are the maximum. The fifth embodiment will be described hereinafter with reference to the drawings.

<Configuration of Adjustor of Pressure Setpoint According to Fifth Embodiment>

Figures 20, 21, 22:
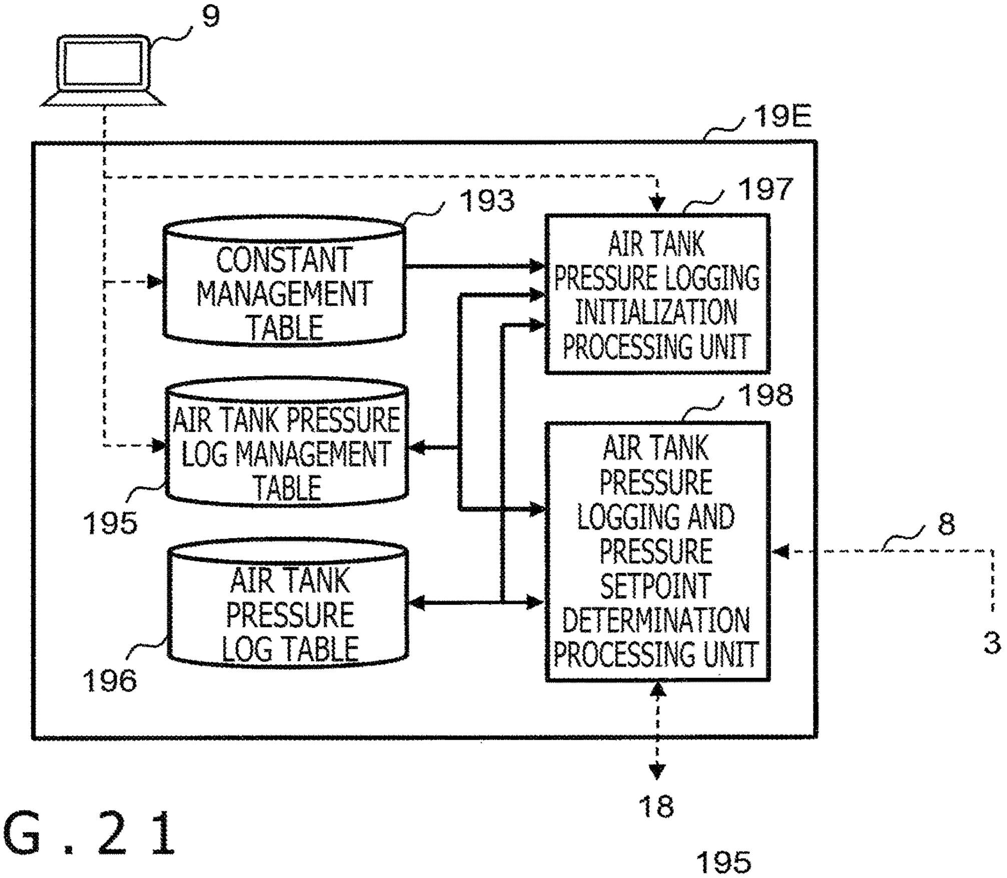
FIG. 20 is a schematic configuration diagram of an adjustor of pressure setpoint according to a fifth embodiment.
FIG. 21 is a detailed configuration diagram of an air tank pressure log management table according to the fifth embodiment.
FIG. 22 is a detailed configuration diagram of an air tank pressure log table according to the fifth embodiment.

FIG. 20 is a schematic configuration diagram of an adjustor of pressure setpoint 19E according to the fifth embodiment. The adjustor of pressure setpoint 19E is configured with not only the constant management table 193 similar to that in the fourth embodiment but also an air tank pressure log management table 195, an air tank pressure log table 196, an air tank pressure logging initialization processing unit 197, and an air tank pressure logging and pressure setpoint determination processing unit 198 for logging sampled values of the air tank pressure.

<Air Tank Pressure Log Management Table According to Fifth Embodiment>

FIG. 21 is a detailed configuration diagram of the air tank pressure log management table 195 according to the fifth embodiment. The air tank pressure log management table 195 is configured with a field 1951 that stores a log counter ($i_{log}$) storing the number of times of logging, a field 1952 that stores a logging time interval ($\Delta T_{1og}$), and a field 1953 that stores a maximum number of times of logging ($N_{log\_max}$). It is assumed that the logging time interval ($\Delta T_{1og}$) and the maximum number of times of logging ($N_{1og\_max}$) are set from the input/output device 9 out of these fields 1951 to 1953.

<Air Tank Pressure Log Table According to Fifth Embodiment>

FIG. 22 is a detailed configuration diagram of the air tank pressure log table 196 according to the fifth embodiment. The air tank pressure log table 196 is configured with a field 1964 that is configured from cases 196-1, 196-2, . . . , and 196-N, the number of which is the same as the maximum number of times of logging ($N_{1og\_max}$) and that indicates how many times of logging each case corresponds to, a field 1965 that stores logging time, and a field 1966 that stores a sampled air tank pressure value.

<Air Tank Pressure Logging Initialization Process According to Fifth Embodiment>

Figure 23:
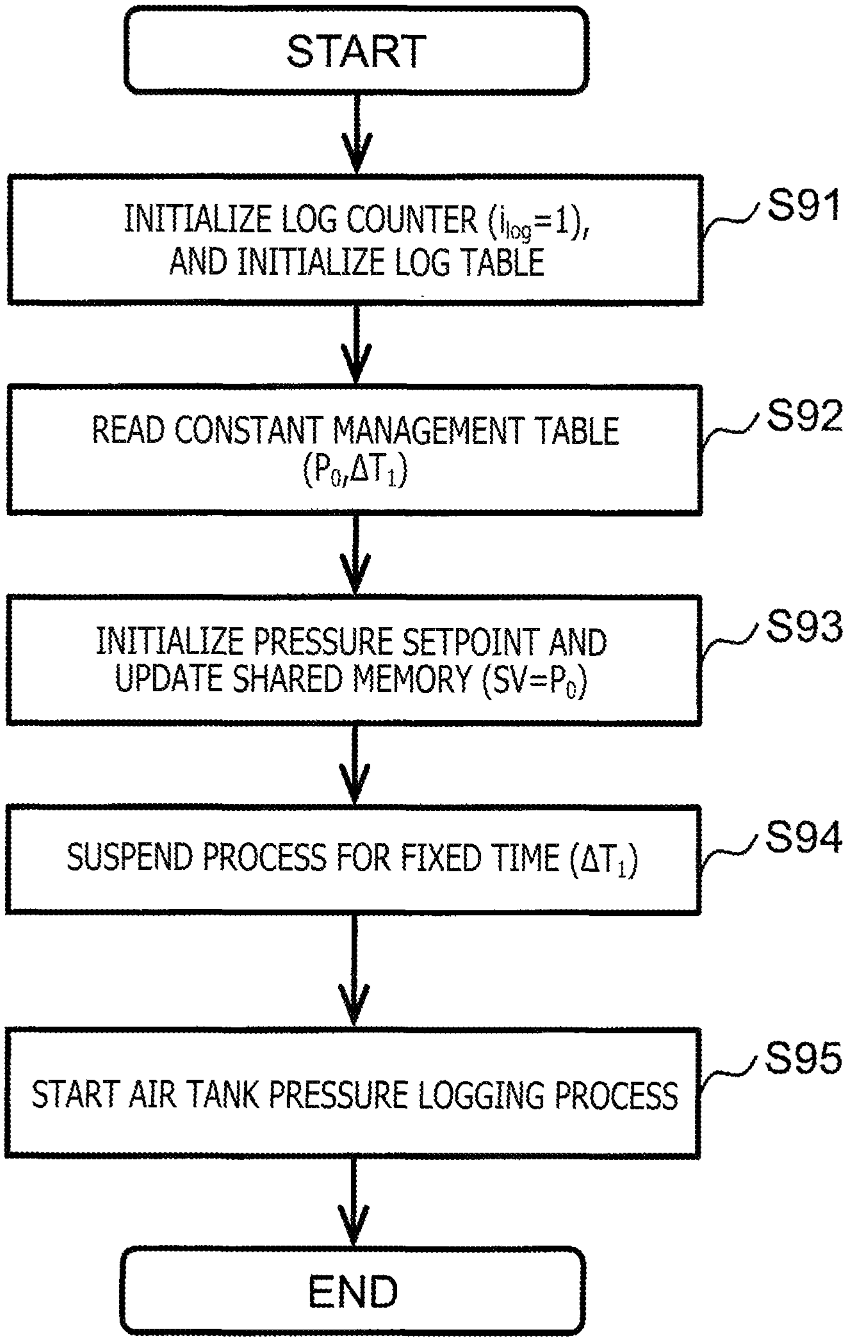
FIG. 23 is a detailed flow of an air tank pressure logging initialization process according to the fifth embodiment.

FIG. 23 is a detailed flow of an air tank pressure logging initialization process according to the fifth embodiment. The present process is started by the air compressor unit 1*b*. First, the air tank pressure logging initialization processing unit 197 initializes the log counter ($i_{log}$) in the field 1951 within the air tank pressure log management table 195 to 1, and further clears all the cases (cases 196-1 to 196-N) within the air tank pressure log table 196 to zero and initializes all the cases (Step S91).

Next, the air tank pressure logging initialization processing unit 197 reads the initial pressure setpoint ($P_0$) and the before-adjustment waiting time ($\Delta T_1$) from the fields 1931 and 1932 in the constant management table 193 (Step S92).

Next, the air tank pressure logging initialization processing unit 197 sets the read initial pressure setpoint ($P_0$) to the field 181 within the shared memory 18 (Step S93). While the pressure setpoint set at this timing is read to the controller of air compressor 17, it is necessary to wait until the air tank pressure reaches the steady-state value because of the operation; thus, the air tank pressure logging initialization processing unit 197 suspends the process for the before-adjustment waiting time $\Delta T_1$ (Step S94), an air tank pressure logging and pressure setpoint determination process by the air tank pressure logging and pressure setpoint determination processing unit 198 is started (Step S95), and the process is ended.

<Air Tank Pressure Logging and Pressure Setpoint Determination Process According to Fifth Embodiment>

Figure 24:
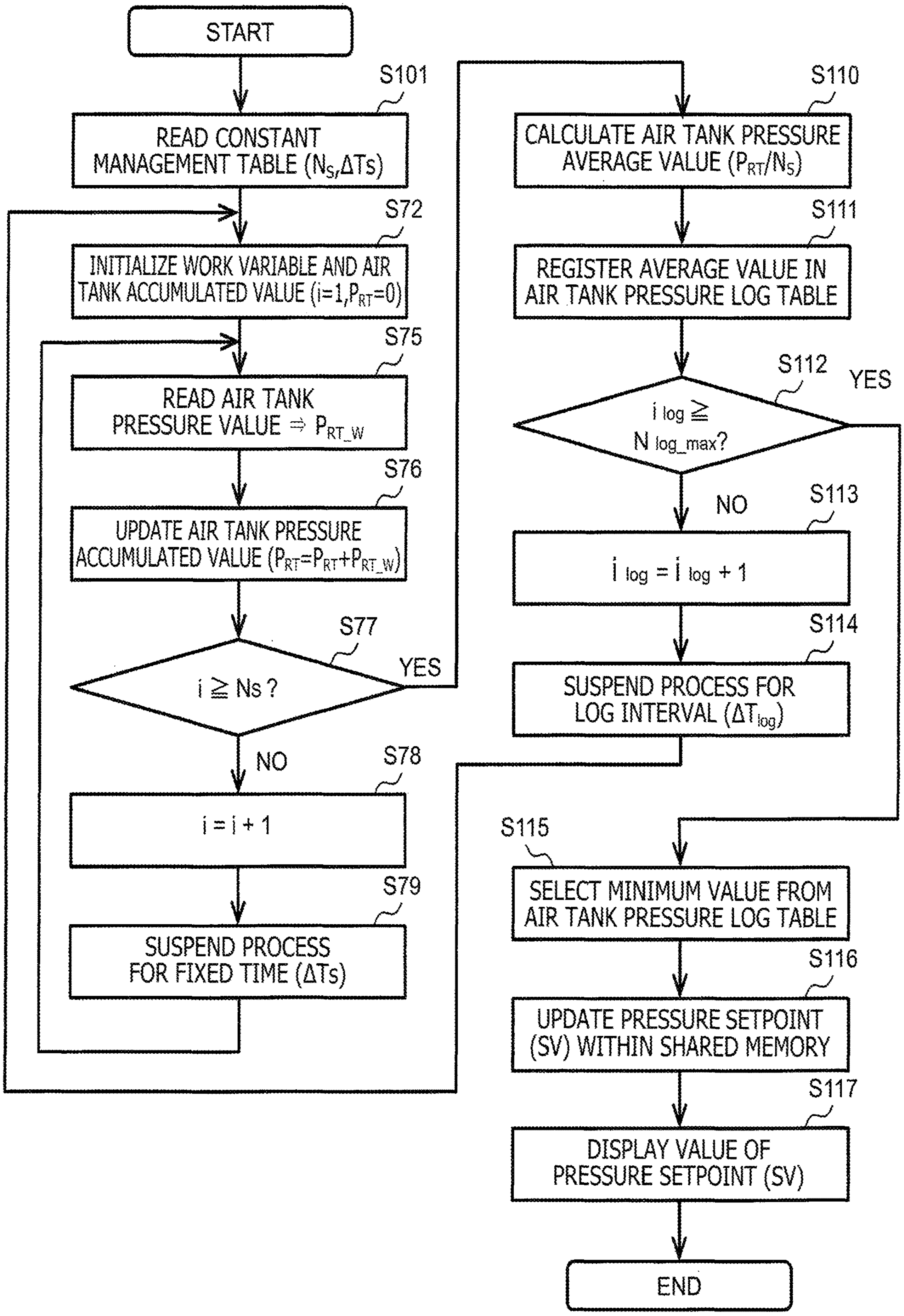
FIG. 24 is a detailed flow of an air tank pressure logging and pressure setpoint determination process according to the fifth embodiment.

FIG. 24 is a detailed flow of an air tank pressure logging and pressure setpoint determination process according to the fifth embodiment. In description of the detailed flow of the air tank pressure logging and pressure setpoint determination process according to the present embodiment depicted in FIG. 24, the same process as that in the detailed flow of the adjustment process according to the fourth embodiment depicted in FIG. 19 is denoted by the same step number and description of the process will be omitted. The present process is started by the air tank pressure logging initialization processing unit 197.

First, the air tank pressure logging and pressure setpoint determination processing unit 198 reads, as constants used in the process, the air tank pressure sampling frequency ($N_S$) and the air tank pressure sampling interval ($\Delta T_s$) from the fields 1933 and 1934 in the constant management table 193 (Step S101).

Next, the air tank pressure logging and pressure setpoint determination processing unit 198 sequentially executes Steps S72, S75, S76, and S77, executes Steps S78 and S79 in a case of Step S77: NO, and moves the process to Step S75 for a next sampling process subsequently to Step S79. Furthermore, in a case of Step S77: YES, the air tank pressure logging and pressure setpoint determination processing unit 198 moves the process to Step S110.

Since, in Step S110, the air tank pressure logging and pressure setpoint determination processing unit 198 determines that the air tank pressure sampling has been carried out by the sampling frequency ($N_S$) (Step S77: YES), the air tank pressure logging and pressure setpoint determination processing unit 198 calculates the average value by dividing the air tank pressure accumulated value $P_{RT}$ measured so far by the sampling frequency ($N_S$) in Step S110.

Next, the air tank pressure logging and pressure setpoint determination processing unit 198 reads the log counter ($i_{log}$) in the field 1951 within the air tank pressure log management table 195, and stores a log counter value, current time, and a calculated air tank pressure average value in the fields 1964, 1965, and 1966, respectively for the case in the air tank pressure log table 196 indicated by a value of the log counter ($i_{log}$) as a pointer (Step S111).

Next, the air tank pressure logging and pressure setpoint determination processing unit 198 checks whether the log counter ($i_{log}$) in the field 1951 is equal to or greater than the maximum number of times of logging ($N_{log\_max}$) in the field 1952 within the air tank pressure log management table 195 (Step S112). In a case in which the log counter ($i_{log}$) in the field 1951 is smaller than the maximum number of times of logging ($N_{log\_max}$) (Step S112: NO), the air tank pressure logging and pressure setpoint determination processing unit 198 increments the log counter ($i_{log}$) by 1 (Step S113), suspends the process for the logging time interval ($\Delta T_{1og}$) in the field 1953 within the air tank pressure log management table 195 (Step S114), and moves the process to Step S72 for executing a next logging process.

On the other hand, in a case in which the log counter ($i_{1og}$) in the field 1951 is equal to or greater than the maximum number of times of logging ($N_{log\_max}$) (Step S112: YES), the air tank pressure logging and pressure setpoint determination processing unit 198 refers to all the cases 196-1 to 196-$N_{log\_max}$ within the air tank pressure log table 196, and selects the case having the minimum air tank pressure in the field 1966 (Step S115). Further, the air tank pressure logging and pressure setpoint determination processing unit 198 writes the minimum air tank pressure selected in Step S115 to the field 181 within the shared memory 18 as the pressure setpoint to update the shared memory 18 (Step S116), displays the value of the pressure setpoint on the input/output device 9 (Step S117), and ends the process.

Through the process described above, the maximum value of the demands for compressed air within the last fixed time is set as the reference, the air compressor unit 1*b* discharges the compressed air in a case in which the demands for compressed air exceeding the reference occur, and it is possible to operate the air compressor units 1 without waste.

Sixth Embodiment

A sixth embodiment will be described with reference to FIG. 25. It is noted that basic configurations and operations of the devices are similar to those in the first to fifth embodiments, the same reference characters are given in FIG. 25 as those in the drawings already described, and description of the same configurations and operations will be omitted.

In the first, fourth, and fifth embodiments described above, the method of adjusting the pressure setpoint when the air compressor unit 1*b* is added during the discharge of the compressed air from the one existing air compressor unit 1*a* has been described. In this adjusting method, information associated with the existing air compressor unit 1*a* is unnecessary. Therefore, even in a case in which the number of existing air compressor units 1 is two or more, it is possible for the air compressor unit 1 to be added to adjust the pressure setpoint similarly to the first, fourth, and fifth embodiments.

Figure 25:
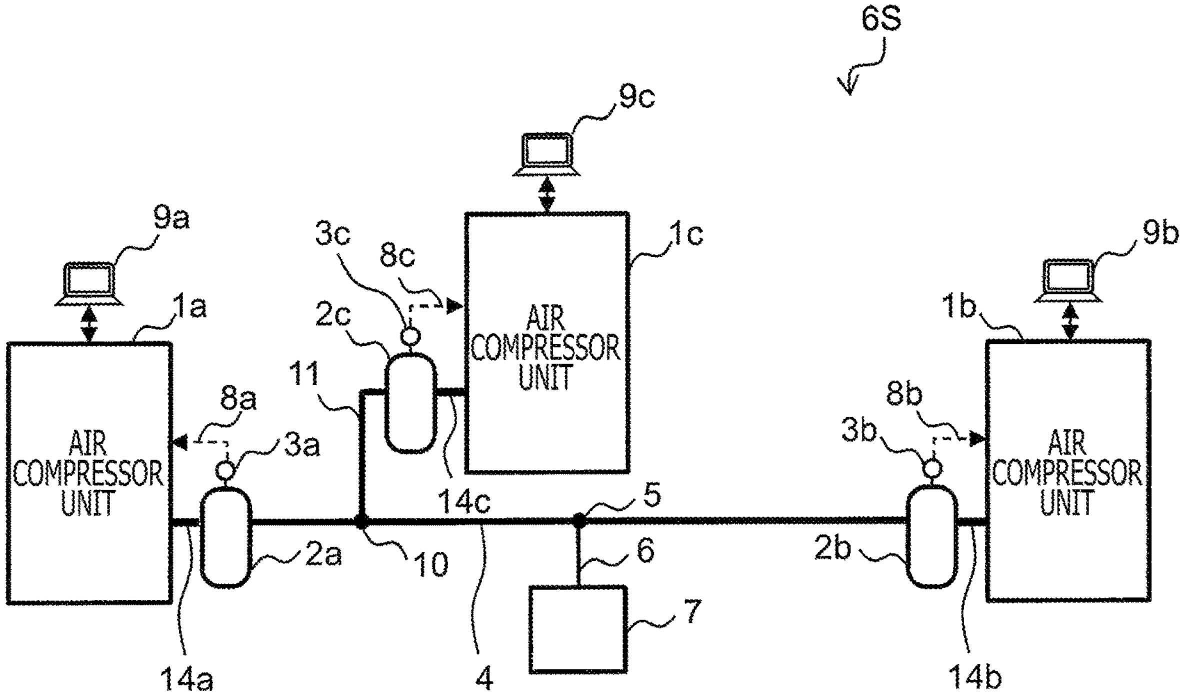
FIG. 25 is an overall schematic configuration diagram of a compressed air system according to a sixth embodiment.

FIG. 25 is an overall schematic configuration diagram of a compressed air system 6S according to the sixth embodiment. FIG. 25 depicts a state in which the air compressor unit 1*a* starts discharging the compressed air, and the air compressor unit 1*b* then adjusts the pressure setpoint in accordance with the method depicted in the first, fourth, or fifth embodiment and starts discharging the compressed air. FIG. 25 also depicts a state in which a third air compressor unit 1*c* is connected to the compressed air distributions line 4 at a branching point 10 via a discharging line 14*c*, an air tank 2*c*, and a line 11 to cope with the further increase in the demands for compressed air.

In the state depicted in FIG. 25, the adjustor of pressure setpoint 19 within the air compressor unit 1*c* executes the process depicted in FIG. 7, FIG. 19, or FIGS. 23 and 24, thereby determining a pressure setpoint of the air tank 2*c*, and the air compressor unit 1*c* in addition to the air compressor units 1*a* and 1*b* discharges the compressed air only in a case in which demands for compressed air exceed a reference that is demands for compressed air at timing of adjustment. At this time, similarly to the first, fourth, and the fifth embodiments, an instruction related to the start or stop of the discharge of the compressed air from a centralized controller or the existing air compressor unit 1 is unnecessary.

Furthermore, in a case in which the demands for compressed air are increased stepwise from a smaller value than the reference at the time of adjusting the pressure setpoint of the air compressor unit 1*b* to a greater value than the reference at the time of adjusting the pressure setpoint of the air compressor unit 1*c*, an operation in an order in which the air compressor unit 1*b* starts discharging the compressed air and the air compressor unit 1*c* then starts discharging the compressed air from the state in which only the air compressor unit 1*a* discharges the compressed air is realized.

Seventh Embodiment

<Configuration of Computer that Realizes Adjustor of Pressure Setpoint>

In the first to sixth embodiments described above, the adjustor of pressure setpoint 19, 19D, or 19E is included in the air compressor unit 1 and configured to exchange information with the controller of air compressor 17 via the shared memory 18. However, the configuration of the adjustor of pressure setpoint 19, 19D, or 19E is not limited to this configuration, the adjustor of pressure setpoint 19, 19D, or 19E may be a computer or the like without being included in the air compressor unit 1, and may be configured to exchange information with the controller of air compressor 17 via a predetermined interface.

Figure 26:
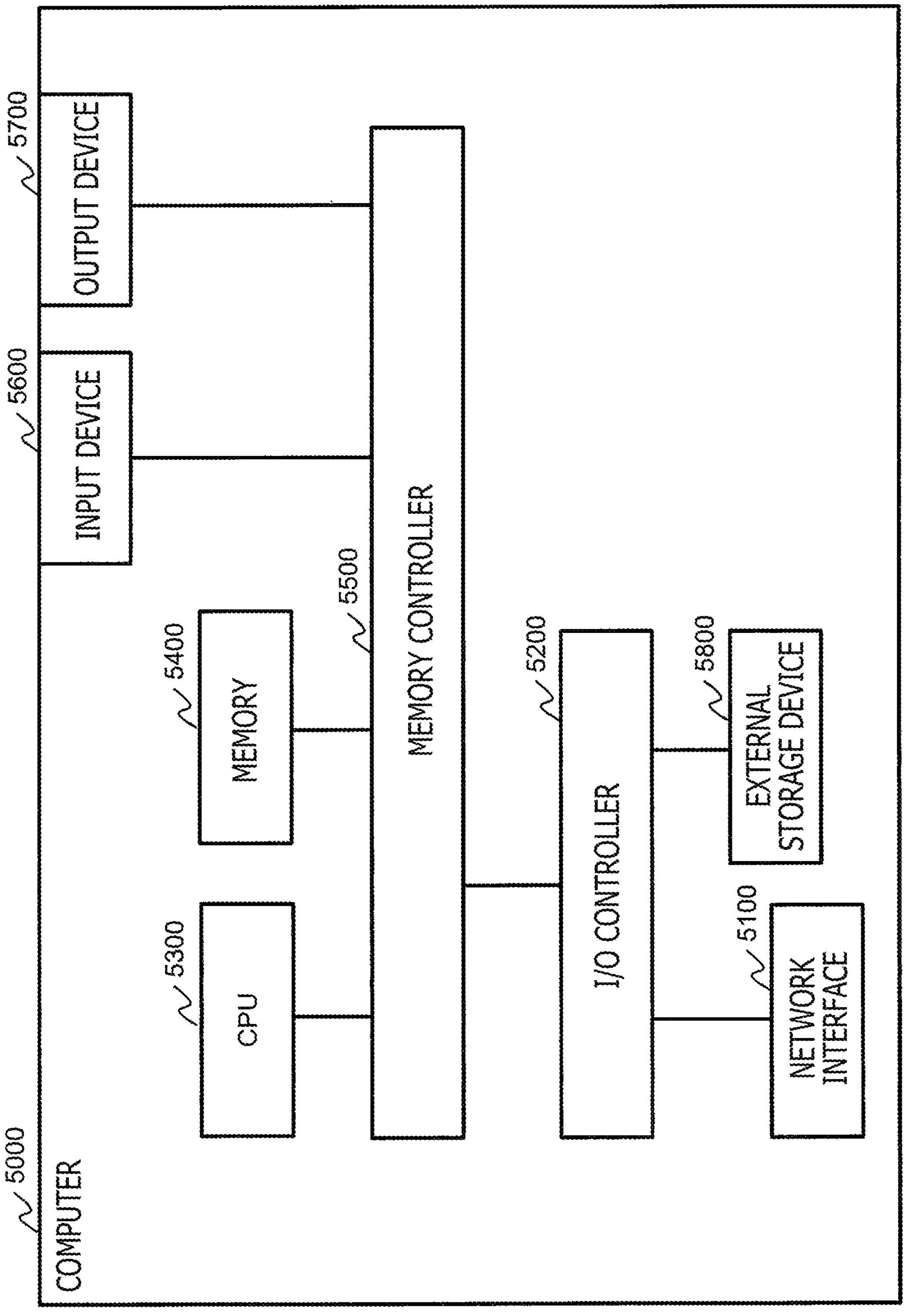
FIG. 26 depicts an example of a configuration of a computer that realizes an adjustor of pressure setpoint as a seventh embodiment.

FIG. 26 depicts an example of a configuration of a computer that realizes the adjustor of pressure setpoint as a seventh embodiment. A computer 5000 that realizes the adjustor of pressure setpoint 19, 19D, or 19E is configured such that a computing device 5300 typified by a central processing unit (CPU), a memory 5400 such as a random access memory (RAM), an input device 5600 (such as a keyboard, a mouse, and a touch panel), and an output device 5700 (such as a video graphic card connected to an external display monitor) are mutually connected via a memory controller 5500.

In the computer 5000, each program for realizing the adjustor of pressure setpoint 19, 19D, or 19E is read from an external storage device 5800 such as a solid state drive (SSD) or a hard disk drive (HDD) via an input/output (I/O) controller 5200, and executed in cooperation of the computing device 5300 and the memory 5400, thereby realizing the adjustor of pressure setpoint 19, 19D, or 19E. Alternatively, each program for realizing the adjustor of pressure setpoint 19, 19D, or 19E may be acquired from an external computer by communication via a network interface 5100.

It is noted that the adjustor of pressure setpoint 19, 19D, or 19E may be provided integrally with the input/output device 9.

The present invention is not limited to the embodiments described above and encompasses various modifications. For example, the embodiments have been described in detail for describing the present invention so that the present invention is easy to understand. The present invention is not always limited to those having all the configurations described so far. Furthermore, the configuration of the certain embodiment can be partially replaced by the configuration of the other embodiment or the configuration of the other embodiment can be added to the configuration of the certain embodiment. Moreover, for part of the configuration of each embodiment, addition, deletion, replacement, integration, and distribution of the other configurations can be made. Furthermore, each process described in each embodiment may be distributed or integrated as appropriate on the basis of processing efficiency or implementation efficiency.

What is claimed is:

1. A compressed air production facility for supplying compressed air to compressed air consuming devices connected to a compressed air distributions line, the compressed air production facility including a plurality of air compressors connected to the compressed air distributions line via respective air tanks, wherein each of the air compressors comprises:

a compressor that compresses air;

an adjusting unit that adjusts a pressure setpoint of an air tank to which the air compressor having the adjusting unit is connected; and a control unit that operates a rotational frequency of the compressor on a basis of the pressure setpoint adjusted by the adjusting unit and a pressure of the air tank, the adjusting unit adjusting the pressure setpoint on a basis of a control variable indicating rotational frequency of the compressor or the pressure of the air tank, the control unit stopping rotation of the compressor by reducing the rotational frequency or setting the rotational frequency to zero in a case in which the pressure of the air tank exceeds the pressure setpoint, and keeping the air tank at the pressure setpoint by increasing the control variable of the compressor in a case in which the pressure of the air tank is below the pressure setpoint, the control units in the plurality of air compressors are not centralized control units but distributed control units and autonomously control each air compressor without communication between the control units and realize operation and stop of the air compressors in response to an increase or decrease in demand for the compressed air, the adjusting unit of each of the air compressors adjusts the pressure setpoint of the air tank independently of each other, and the adjusting unit determines whether a value of the control variable is greater than or equal to zero, and in a case in which the control variable is less than zero the adjusting unit increases the pressure setpoint of the air tank from a predetermined pressure stepwise by a pressure setpoint update width until the control variable is greater than or equal to zero, at which time the adjusting unit performs an additional adjustment of the pressure setpoint, in which the pressure setpoint is set equal to $$SV-\left(\frac{fnow}{|fbef|+fnow}\right)\times\Delta SV,$$

wherein fnow is a latest value of the control variable, fbef is a previous value of the control variable, and ΔSV is the pressure setpoint update width.

2. The compressed air production facility according to claim 1, wherein the adjusting unit reduces the pressure setpoint of the air tank from an initial setpoint pressure stepwise, and sets, as the pressure setpoint, a value obtained when the control variable of the air compressor output from the control unit changes from a positive value to zero and the air compressor stops discharging the compressed air.

3. The compressed air production facility according to claim 2, wherein an input of the initial pressure is received via an input screen.

4. The compressed air production facility according to claim 2, wherein, when the air compressor having the adjusting unit is an air compressor to be added to the compressed air production facility, the adjusting unit sets a pressure setpoint of an existing air compressor as the initial pressure setpoint of the air compressor having the adjusting unit, stores the control variable output from the control unit at the initial pressure setpoint, reduces the pressure setpoint stepwise from the initial pressure setpoint, and determines the pressure setpoint of the air compressor having the adjusting unit based on: a value obtained when the control variable of the air compressor output from the control unit changes from the positive value to zero, the stored control variable, rated values of the air compressor having the adjusting unit and the existing air compressor, locations where the air compressors are disposed in the compressed air production facility, and a shape of the compressed air distributions line.

5. The compressed air production facility according to claim 4, wherein an input of the rated values is received via an input screen.

6. The compressed air production facility according to claim 1, wherein the adjusting unit determines the pressure setpoint of the air compressor having the adjusting unit on a basis of a pressure value of the air tank connected to the air compressor having the adjusting unit when the air compressor having the adjusting unit does not discharge the compressed air in a case in which the air compressor having the adjusting unit is an air compressor to be added to the compressed air production facility with respect to an existing air compressor in the compressed air production facility.

7. The compressed air production facility according to claim 6, wherein the adjusting unit measures pressure values of the air tank connected to the air compressor for constant time, stores the measured pressure values, and determines the pressure setpoint of the air compressor on a basis of a minimum value of the stored pressure values in a case in which the air compressor is an air compressor to be added to the compressed air production facility with respect to the existing air compressor.

8. The compressed air production facility according to claim 7, wherein the existing air compressor is two or more air compressors.

9. The compressed air production facility according to claim 6, wherein the existing air compressor is two or more air compressors.

10. The compressed air production facility according to claim 6, wherein the existing air compressor is two or more air compressors.

11. A compressed air pressure setpoint adjusting method executed by a compressed air production facility for supplying compressed air to compressed air consuming devices connected to a compressed air distributions line, the compressed air production facility including a plurality of air compressors connected to the compressed air distributions line via respective air tanks, each of the air compressors including a compressor that compresses air, an adjusting unit that adjusts a pressure setpoint of an air tank to which the air compressor comprising the adjusting unit is connected, and a control unit that operates a rotational frequency of the compressor on the basis of the pressure setpoint adjusted by the adjusting unit and a pressure of the air tank, the method comprising:

by the adjusting unit, adjusting the pressure setpoint on a basis of a control variable indicating rotational frequency of the compressor or the pressure of the air tank, by the control unit, stopping rotation of the compressor by reducing the rotational frequency or setting the rotational frequency to zero in a case in which the pressure of the air tank exceeds the pressure setpoint, and keeping the air tank at the pressure setpoint by increasing the control variable of the compressor in a case in which the pressure of the air tank is below the pressure setpoint, the control units in the plurality of air compressors are not centralized control units but distributed control units and autonomously control each air compressor without communication between the control units and realize operation and stop of the air compressors in response to an increase or decrease in demand for the compressed air, the adjusting unit of each of the air compressors adjusts the pressure setpoint of the air tank independently of each other, and the adjusting unit determines whether a value of the control variable is greater than or equal to zero, and in a case in which the control variable is less than zero the adjusting unit increases the pressure setpoint of the air tank from a predetermined pressure stepwise by a pressure setpoint update width until the control variable is greater than or equal to zero, at which time the adjusting unit performs an additional adjustment of the pressure setpoint, in which the pressure setpoint is set equal to $$SV-\left(\frac{fnow}{|fbef|+fnow}\right)\times\Delta SV,$$

wherein fnow is a latest value of the control variable, fbef is a previous value of the control variable, and ΔSV is the pressure setpoint update width.

12. A non-transitory computer-readable medium storing a compressed air pressure setpoint adjusting program for a computer, which when executed causes the computer to execute a method comprising:

functioning as an adjusting unit that is connected to each of a plurality of air compressors and that adjusts a pressure setpoint in a compressed air production facility for supplying compressed air to compressed air consuming devices connected to a compressed air distributions line, the compressed air production facility including the plurality of air compressors connected to the compressed air distributions line via respective air tanks, each of the air compressors including a compressor that compresses air, and a control unit that operates a rotational frequency of the compressor on a basis of a pressure setpoint of an air tank to which each of the air compressors is connected and a pressure of the air tank, by the adjusting unit, adjusting the pressure setpoint on the basis of a control variable indicating the rotational frequency of the compressor or the pressure of the air tank, and by the control unit, stopping rotation of the compressor by reducing the rotational frequency or setting the rotational frequency to zero in a case in which the pressure of the air tank exceeds the pressure setpoint, and keeping the air tank at the pressure setpoint by increasing the control variable of the compressor in a case in which the pressure of the air tank is below the pressure setpoint, the control units in the plurality of air compressors are not centralized control units but distributed control units and autonomously control each air compressor without communication between the control units and realize operation and stop of the air compressors in response to an increase or decrease in demand for the compressed air, the adjusting unit of each of the air compressors adjusts the pressure setpoint of the air tank independently of each other, and the adjusting unit determines whether a value of the control variable is greater than or equal to zero, and in a case in which the control variable is less than zero the adjusting unit increases the pressure setpoint of the air tank from a predetermined pressure stepwise by a pressure setpoint update width until the control variable is greater than or equal to zero, at which time the adjusting unit performs an additional adjustment of the pressure setpoint, in which the pressure setpoint is set equal to $$SV-\left(\frac{fnow}{|fbef|+fnow}\right)\times\Delta SV,$$

wherein fnow is a latest value of the control variable, fbef is a previous value of the control variable, and ΔSV is the pressure setpoint update width.

* * * * *